United States Patent [19]
Rossignac et al.

[11] Patent Number: 5,825,369
[45] Date of Patent: Oct. 20, 1998

[54] COMPRESSION OF SIMPLE GEOMETRIC MODELS USING SPANNING TREES

[75] Inventors: Jarek Jaroslaw Roman Rossignac, Cronton-on-Hudson; Gabriel Taubin, Hartsdale, both of N.Y.

[73] Assignee: International Business Machines Corporation, Armonk, N.Y.

[21] Appl. No.: 688,572

[22] Filed: Jul. 30, 1996

[51] Int. Cl.$^6$ .................................................. G06F 15/00
[52] U.S. Cl. ............................................................ 345/440
[58] Field of Search ................................... 345/440, 441, 345/442, 443, 133, 118

[56] References Cited

U.S. PATENT DOCUMENTS

| | | | |
|---|---|---|---|
| 2,542,768 | 2/1951 | Gresham et al. | 260/465.6 |
| 2,564,105 | 8/1951 | Gresham et al. | 260/465.6 |
| 2,626,282 | 1/1953 | Cunningham et al. | 260/601 |
| 2,676,190 | 4/1954 | Bernard et al. | 260/601 |
| 2,776,996 | 1/1957 | Hunt et al. | 260/601 |
| 3,438,868 | 4/1969 | Sawaki et al. | 203/8 |
| 3,529,940 | 9/1970 | Shima et al. | 23/288 |
| 3,574,766 | 4/1971 | Meyer et al. | 260/601 |
| 3,833,651 | 9/1974 | Ouchi et al. | 260/534 S |
| 3,878,057 | 4/1975 | Mannsfeld | 203/35 |
| 4,048,232 | 9/1977 | Koberstein et al. | 260/601 R |
| 4,225,516 | 9/1980 | Biola et al. | 568/41 |
| 4,319,047 | 3/1982 | Komorn et al. | 568/41 |
| 5,015,776 | 5/1991 | Sandler | 568/41 |
| 5,155,262 | 10/1992 | Etzkorn et al. | 562/532 |
| 5,183,936 | 2/1993 | Etzkorn et al. | 562/532 |
| 5,198,578 | 3/1993 | Etzkorn et al. | 562/532 |
| 5,233,688 | 8/1993 | Too | 345/440 |
| 5,352,837 | 10/1994 | Hsu et al. | 568/41 |

FOREIGN PATENT DOCUMENTS

| | | |
|---|---|---|
| 797873 | 10/1968 | Canada . |
| 820968 | 8/1969 | Canada . |
| 2314917 | 1/1970 | France . |
| 48-56144 | 11/1973 | Japan . |
| 6809647 | 1/1970 | Netherlands . |
| 850 95 | 10/1984 | Romania . |
| 1150252 | 4/1969 | United Kingdom . |
| 1162054 | 8/1969 | United Kingdom . |
| 1166961 | 10/1969 | United Kingdom . |
| 1173175 | 12/1969 | United Kingdom . |
| 1177470 | 1/1970 | United Kingdom . |
| WO 96/01810 | 1/1996 | WIPO . |

OTHER PUBLICATIONS

Pierson et al., "Synthesis of DL–Methionine", vol. 70, pp. 1450–1451 (1948).

Hickinbottom, W.J., "Reactions of Organic Compounds", pp. 381–383 (1957).

*Primary Examiner*—Phu K. Nguyen
*Attorney, Agent, or Firm*—Louis J. Percello

[57] ABSTRACT

A computer system stores and transmits compressed simple triangular meshes. The computer uses a data structure that represents a simple triangular mesh in n-dimensional space. The data structure has a table of vertex runs, a table of triangle runs, zero or more marching records, which provide the connectivity information of the triangular mesh. The data structure also has zero or more associated data records that include the geometric information of the triangular mesh. The table of triangle runs and the marching record have information that describes how to construct a triangular mesh (therefore, the polygon vertices and the boundary edges). The table of vertex runs describes a vertex spanning tree that provides additional connectivity information to construct the triangular mesh from the polygon. The associated data record determines the exact position of the triangular mesh in space. The system also includes ways for creating this data structure from a simple triangular mesh, transmitting this information between computers, and compressing and decompressing this transmitted information.

38 Claims, 17 Drawing Sheets

COMPRESSION OF SIMPLE GEOMETRIC MODELS USING SPANNING TREES

CROSS-REFERENCE TO RELATED APPLICATIONS

The present application claims priority to co-pending U.S. provisional application 60/010,045, filed on Jan. 16, 1996 and entitled "Compression of Geometric Models Using Spanning Trees".

FIELD OF THE INVENTION

This invention relates to the field of computer graphics. More specifically, the invention relates to the compressed transmission and storage of three dimensional geometric models.

BACKGROUND OF THE INVENTION

Although modeling systems in Mechanical Computer Aided Design and in animation are expanding their geometric domain to free form surfaces, polyhedral models remain the primary 3D representation used in the manufacturing, architectural, Geographic Information Systems, geoscience, and entertainment industries. Polyhedral models are particularly effective for hardware assisted rendering, which is important for video-games, virtual reality, fly-through, and electronic mock-up applications involving complex Computer Aided Design models.

In comparison to image and video compression, little attention has been devoted to the compression of 3D shapes, both from the research community and from 3D data exchange standards committees. However, a need for this compression is rapidly developing for three reasons: 1) The exploding complexity of industrial Computer Aided Design models raises significantly the cost of the memory and auxiliary storage required by these models. 2) The distribution of 3D models over networks for collaborative design, gaming, rapid prototyping, or virtual interactions is seriously limited by the available bandwidth. 3) The graphics performance of high level hardware adapters is limited by insufficient on-board memory to store the entire model or by a data transfer bottleneck.

Since methods are known in the prior art for easily and efficiently triangulating arbitrary polygonal faces, it is sufficient to consider geometric models defined by triangular meshes. A triangular mesh is defined by the position of its vertices (geometry), which are n-dimensional vectors, by the association between each triangle and its sustaining vertices (connectivity), and by colors, normals, and texture coordinates (photometry), which does not affect the 3D geometry, but influences the way it is shaded.

The prior art in 3D geometric compression may be divided into three categories: simplification, geometry encoding, and connectivity encoding.

Polyhedral simplification techniques reduce the number of vertices in the mesh by altering the model's connectivity and by possibly adjusting the position of the remaining vertices to minimize the error produced by the simplification. These techniques target the generation of multiple levels of detail (LOD) for accelerated graphics or data reduction for over-sampled meshes. Although these techniques could be considered for lossy compression, they are inappropriate for applications that require access to the exact connectivity of the model. In fact simplification techniques are orthogonal to the compression techniques described here because geometric compression may be applied to each level of detail.

Geometry encoding techniques use lossy or lossless compression to reduce the storage necessary for the geometric data associated with vertex positions, and possibly with colors, normals and texture coordinates. Applying general purpose binary compression algorithms to the geometric data stream leads to suboptimal solutions. A geometric compression approach that involves normalizing the geometry into a unit cube and rounding off the vertex coordinates to fixed length integers is described by Michael Deering in "Geometric Compression", *Computer Graphics* (Proc. SIGGRAPH), pages 13–20, August 1995, which is here incorporated by reference in its entirety. The rounding controls the amount of lost information.

Connectivity encoding techniques attempt to reduce the redundancy inherent to many popular representations of polyhedral or triangular meshes. For example, Connectivity encoding techniques try to minimize the number of bits required to represent without loss of information the triangles of a triangular mesh of V vertices and T triangles.

On one extreme, if the vertices are always organized into a regular 2D grid, the triangle mesh may be completely defined by the number of rows and columns of the grid. Regular grids may be appropriate for terrain modeling in Geographic Information Systems and for rendering uniformly tesselated non-trimmed rectangular parametric patches. However, they are not suitable for modeling the more general 3D shapes found in Computer Aided Design, entertainment, and other applications.

At the other extreme, the vertex positions of a triangular mesh of V vertices and T triangles may be represented with an array, the vertex positions array, and each triangle may be represented by 3 indices into the vertex positions array. This solution does not impose any topological limitations on the mesh, but requires storing 3 addresses per triangle (approximately 6 addresses per vertex for typical triangular meshes). Even if the models were restricted to less than 1000 vertices, this scheme would consume 60 bits per vertex for the connectivity information alone.

Triangle strips used in graphics application programming interfaces (APIs) (described by J. Neider, T. Davis, and M. Woo. in *OpenGL Programming Guide*, Addison-Wesley, 1993; which is here incorporated by reference in its entirety) provide a compromise where a new vertex is combined with the previous two vertices to implicitly define a new triangle in the current strip. Triangle strips only pay off if one can build long strips, which is a challenging computational geometry problem. Furthermore, because on average a vertex is used twice, either as part of the same triangle strip or of two different ones, the use of triangle strips with OpenGL requires sending most vertices multiple times. The absence of the swap operation further increases this redundancy.

The application of triangle strips as a compression technique, where the locations of all vertices are available for random access during decompression, would still require storing one vertex reference per triangle, two vertex references per strip, the book keeping information on the number and length of the strips, and an additional bit of information per triangle indicating witch open side of the previous triangle should be used as the basis for the next triangle (this bit is equivalent to the SWAP operation in GL).

In Deering's method a stack-buffer is used to store 16 of the previously used vertices instead of having random access to all of the vertices of the model. This is a suitable solution for adapters with very limited on-board memory. Deering also generalizes the triangle strip syntax by providing more general control over how the next vertex is used and by allowing the temporary inclusion of the current vertex on the stack and the reuse of any one of the 16 vertices of the stack-buffer. The storage cost for this connectivity information is: one bit per vertex to indicate whether the vertex should be pushed onto the stack-buffer, two bits per triangle to indicate how to continue the current strip, one bit per triangle to indicate whether a new vertex should be read or whether a vertex from the stack-buffer should be used, and 4 bits of address for selecting a vertex from the stack-buffer, each time an old vertex is reused. Assuming that each vertex is reused only once, the total cost for encoding the connectivity information is: 1+4 bits per vertex plus 2+1 bits per triangle. Assuming 2 triangles per vertex, the total cost is roughly 11 bits per vertex. As far as we know, algorithms for systematically creating good traversals of general meshes using Deering's generalized triangle mesh syntax have not yet been developed. Naive traversal of the mesh may result in many isolated triangles or small runs, implying that a significant portion of the vertices will be sent more than once, and hence increasing the number of bits per triangle.

None of the prior art methods for connectivity encoding preserve the original connectivity of the triangular mesh. All of these methods partition the triangular mesh into connected subsets of triangles. The vertices shared by two or more parts are represented multiple times. This may not be a problem when the compression method is meant to be used to better utilize the communication bandwidth between a CPU and a graphics adapter in a computer, but this change of connectivity is a serious disadvantage in other applications which require preserving the topological properties of the original mesh.

FIG. 1, comprising FIG. 1A and FIG. 1B, is a prior art example of trees. The prior art (described by "R. E. Tarjan." in *Data Structures and Network Algorithms*, SIAM, 1983; which is here incorporated by reference in its entirety) recognizes that a tree 1000 is composed of one or more nodes and one or more edges, each edge connecting a pair of the nodes. A node 1010 connected by a single edge 1015 to another node 1030 is a *leaf node*. A node 1020 connected by two edges (1025, 1035) to two other nodes (1030, 1050) is a *regular node*. A node 1030 connected by three or more edges (1015, 1035, 1045) to respective nodes (1010, 1020, and 1055) is a *branching node*. A tree can be described as a set of one or more runs. A run is a sequence of nodes, with each pair of consecutive nodes connected by an edge. The sequence has a first node that is a leaf or branching node, zero or more intermediate nodes that are regular nodes, and a last node that is a leaf or branching node. For example, the leaf node 1040, the regular nodes 1050 and 1020, and the branching node 1030 define the run (1040,1050,1020,1030).

A *rooted tree* 1100 is a tree with one of its nodes 1110 identified as a *root node*. The root node determines a parent-child relation between each pair of nodes connected by an edge. The root node also determines the first and last node of each run. The root node partially determines an order of traversal of the rooted tree. To fully specify the order of traversal, the runs must be further partitioned into one or more *sets of common first node runs*, each set composed of all the runs that share a common first node, and an ordering must be assigned to the runs within each one of the sets of common first node runs. For example, the choice of node 1110 as the root of the rooted tree 1100 determines that nodes 1120 and 1150 are the first and last nodes of run (1120,1130,1140,1150), respectively, and nodes 1120 and 1180 are the first and last nodes of run (1120,1160,1170, 1180), respectively. But which one of these two runs is traversed first is not determined by the choice of node 1110 as the root of the tree, and has to be explicitly specified.

FIG. 2, comprising FIG. 2A, FIG. 2B, FIG. 2C, FIG. 2D, and FIG. 2E, is prior art example of triangular meshes. A triangular mesh 2100 is composed of vertices 2110, edges 2120, and triangles 2130.

A *path* on a triangular mesh is a sequence of non-repeated vertices such that each pair of consecutive vertices are connected by an edge. The first and last vertex of a path are said to be *connected* by the path. For example, the vertices 2140 and 2165 are connected by the path defined by the sequence formed by vertices 2140, 2150, 2160, and 2165. A triangular mesh is *connected* if every pair of its vertices is connected by a path. For example, the triangular mesh 2100 is connected, and the triangular mesh 2200 is not. When a triangular mesh is not connected it is composed of two or more *connected components*, where each connected component is a connected triangular mesh composed of a subset of vertices, edges, and triangles of the original triangular mesh and with two vertices of the triangular mesh belonging to the same connected component if they are connected by a path. For example, the triangular mesh 2200 is composed of two connected components, the triangular mesh 2210, and 2220. Vertices 2230 and 2240 belong to the same connected component because they can be connected by a path. Vertices 2230 and 2250 belong to different connected components because there exists no path connecting them.

An edge of a triangular mesh is a *boundary edge* if it belongs to exactly one triangle, an *internal edge* if is shared by exactly two triangles, and a *singular edge* if it is shared by three or more triangles. For example, edge 2350 of triangular mesh 2300 is a boundary edge, all the edges of triangular mesh 2100 are internal edges, and edge 2340, of the triangular mesh 2300 is a singular edge, because it is shared by triangles 2310, 2320, and 2330. (Note that boundary edges and internal edges are also called regular edges.) A vertex of a triangular mesh is a *regular vertex* if the set of vertices of all the triangles of the triangular mesh that contain the vertex, excluding the given vertex, can be reordered to define a single path. If a vertex is not a regular vertex, then it is a *singular vertex*. For example, all the vertices of triangular mesh 2100 are regular, and vertex 2410 of triangular mesh 2400 is singular because there is no way of reordering the vertices of all the triangles incident to vertex 2410, excluding vertex 2410, to form a single path. A triangular mesh has *boundary* if it has one or more boundary edges. For example, the triangular meshes 2100 and 2200 have no boundary, and the triangular meshes 2300 and 2400 have a boundary. A triangular mesh is a *manifold* if it has no singular vertices and no singular edges. If a triangular mesh is not a manifold, it is a *non-manifold*. For example, the triangular meshes 2100 and 2200 are manifolds, but the triangular mesh 2300 is a non-manifold.

An orientation of a triangle of a triangular mesh is an ordering of the tree vertices of the triangle, modulo cyclical permutations. Therefore, a triangle of a triangular mesh has two possible orientations. For example, the two different orientations of triangle 2130, composed of vertices 2110, 2170, and 2180, are the orderings (2110,2170,2180) and (2180,2170,2110). But the orderings (2110,2170,2180) and (2180,2110,2170) define the same orientation of the triangle because they are related by a cyclical permutation.

An orientation of an edge of a triangular mesh is one of the two possible orderings of the two vertices of the edge. For example, the two orientations of edge 2120 of the triangular mesh 2100 are defined by the orderings (2110, 2170) and (2170,2110) of the vertices 2110 and 2170. The two orientations of an edge are said to be opposite of each other. An orientation of a triangle induces a consistent orientation on the three incident edges. For example, the orientation (2110,2170,2180) induces the consistent orientations (2110,2170), (2170,2180), and (2180,2110) on the three edges of triangle 2130. A manifold triangular mesh is *orientable* if an orientation can be chosen for each triangle of the triangular mesh in such a way that for each internal edge of the triangular mesh, the two triangles incident to the edge induce opposite orientations on the common edge. If a manifold triangular mesh is not orientable, then it is *non-orientable*. All non-manifold triangular meshes are non-orientable. For example, triangular mesh 2100 is orientable, and triangular mesh 2500 is non-orientable.

The Euler characteristic of a triangular mesh with V vertices, E edges, and T triangles is the number $\chi = V - E + F$. It is known in the prior art (described by "W. S. Massey" in *Algebraic Topology: An Introduction*, Harcourt, Brace & World, 1967; which is here incorporated by reference in its entirety) that two connected manifold triangular meshes of the same Euler characteristic can be continuously deformed into one another if both are orientable, or both are non-orientable.

A triangular mesh with V vertices and T triangles is usually represented in the prior art (described by "Foley et. al." in *Computer Graphics: Principles and Practice*, Addison-Wesley, 1990; which is here incorporated by reference in its entirety) by a *vertex positions array* and a *triangle array*. The position of each vertex of the triangular mesh is represented in the vertex positions array by n floating point coordinates. Each triangle of the triangular mesh is represented in the triangle array by three indices to the vertex positions array.

For the purposes of this disclosure, a *simple triangular mesh* is a triangular mesh with n-dimensional vertices that is connected, oriented, manifold, without boundary, and of Euler characteristic 2. For example, triangular mesh 2100 is a simple triangular mesh in 3-dimensional space. For example, every simple triangular mesh can be obtained by triangulating and continuously deforming a sphere.

OBJECTS OF THE INVENTION

An object of this invention is an improved system and method for compressing, storing, transmitting, and decompressing simple triangular meshes.

An object of this invention is an improved system and method for representing the connectivity information of a simple triangular mesh, i.e., which vertices of the simple triangular mesh form a triangular face of the mesh, without loss of information in compressed form.

An object of this invention is an improved system and method for representing vertex positions, normals, colors, and texture coordinates of a simple triangular mesh in compressed form.

SUMMARY OF THE INVENTION

The present invention is a computer system and method for compressing, storing, transmitting, and decompressing simple triangular meshes.

The computer uses a data structure that represents a simple triangular mesh in compressed form. The data structure has a table of triangle runs, one marching record, and a table of vertex runs which describe the connectivity information of the simple triangular mesh. The data structure also has an optional associated data record with information describing the positions of the vertices of the simple triangular mesh. The data structure may also have one or more additional data records, each additional data record with information describing one of a colors, normals, or texture coordinates of the simple triangular mesh.

The simple triangular mesh can be represented by a triangulated polygon. The triangles in the polygon are called polygon triangles, there are no internal vertices in the triangulated polygon, the boundary of the polygon is closed, and each of the vertices of the triangular mesh corresponds to one or more vertices lying on the boundary of the polygon. The table of triangle runs and the marching record determine how the polygon is triangulated. To recreate the triangular mesh from the triangulated polygon, the vertices (edges) on the boundary of the triangulated polygon are connected by traversing a vertex spanning tree that is defined by the table of vertex runs.

By converting the triangular mesh (e.g. a surface) into a triangulated polygon (and visa versa), information about the triangular mesh can be efficiently stored, compressed, transmitted, and decompressed.

The table of triangle runs describes a triangle spanning tree. The triangle spanning tree has triangle nodes and triangle edges. Each triangle node is associated with a polygon triangle. A plurality of these polygon triangles triangulate the polygon. This causes the polygon to have polygon vertices and a polygon boundary, where all the polygon vertices lie on the polygon boundary. Some of the edges of the polygon triangles, called boundary edges, lie on the polygon boundary, and connect two polygon vertices. The remaining edges of the polygon triangles, called internal edges, are each shared by two polygon triangles, and are internal to the polygon.

The marching record has additional information that describes how to construct the polygon triangles (therefore, the polygon vertices and the boundary edges) by traversing the triangle spanning tree.

The table of vertex runs describes a vertex spanning tree. The vertex spanning tree has vertex tree nodes and vertex tree edges. The vertex spanning tree provides additional connectivity information to construct the simple triangular mesh from the polygon. While traversing the vertex spanning tree, pairs of boundary edges are identified as being a single edge of the simple triangular mesh. Therefore, traversing the vertex spanning tree establishes a one to one correspondence between the vertex tree nodes and the vertices of the simple triangular mesh.

Once the connectivity information of the simple triangular mesh is established, the information contained in the associated data record determines the positions of the vertices of the simple triangular mesh. The information contained in the optional additional data records determines the colors, normals, and texture coordinates of the triangular mesh.

The invention also includes a system and method for compressing a simple triangular mesh by representing it with this data structure, for decompressing a simple triangular mesh represented with this data structure, and for transmitting a compressed simple triangular mesh represented with this data structure between computers.

BRIEF DESCRIPTION OF THE DRAWINGS

FIG. 1, comprising

FIG. 2, comprising

FIG. 6, comprising

FIG. 9, comprising

DETAILED DESCRIPTION OF THE INVENTION

Figure 15:
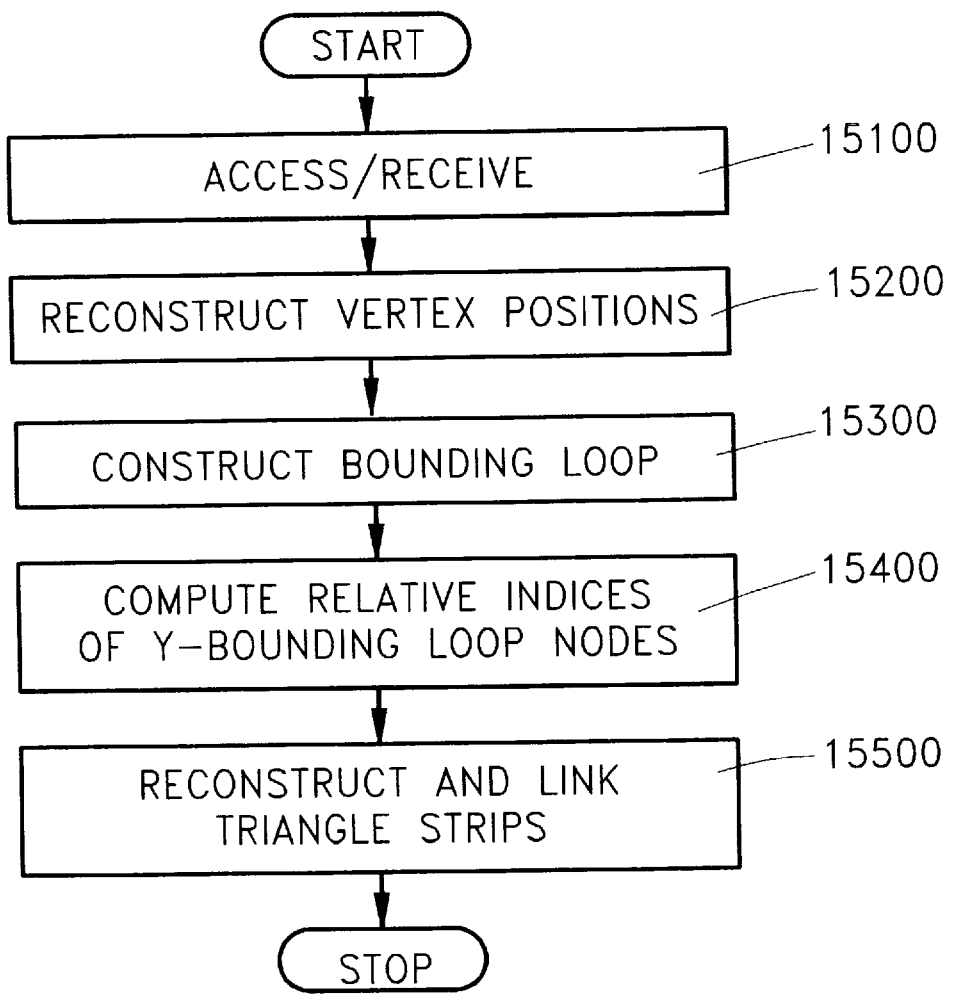
FIG. 15 is flow chart showing the steps of a preferred decompression process.

In computer graphics, geometric objects or models can be represented by triangular meshes that can be further represented by simple triangular meshes. In this description, examples of these meshes are shown in FIGS. 6 and 9. In a compression process 8000 show in FIG. 8, these meshes can be cut along edges in specific ways described in FIG. 6B to create a triangulated polygon (FIG. 6E) representation of the triangular mesh (geometric object, e.g. FIG. 6A). The triangulation of the polygon is defined by information given by a table of triangle runs and a marching record. (See FIG. 5 generally or for a specific embodiment using a set of points see FIGS. 3 and 4.) Other information required to reconstruct the triangular mesh from the triangulated polygon is preserved in a table of vertex runs. This information is shown in FIG. 5 along with positional information about the vertices of the triangular mesh. A decompression process used to reconstruct the triangular mesh is shown in FIG. 15.

Figure 3:
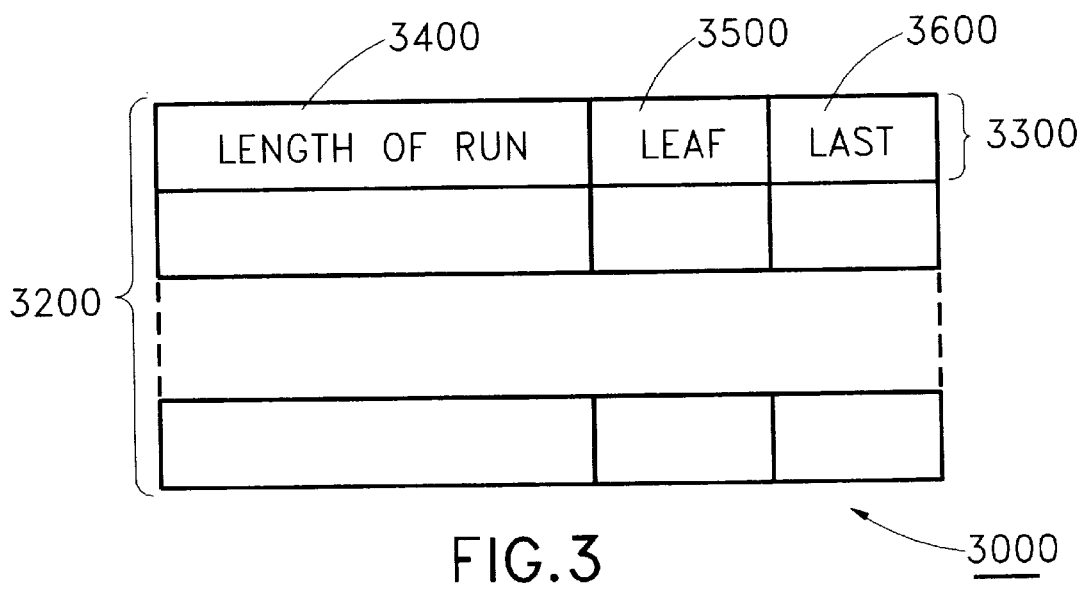
FIG. 3 is a block diagram of the data structure representing a tree.
Figure 4:
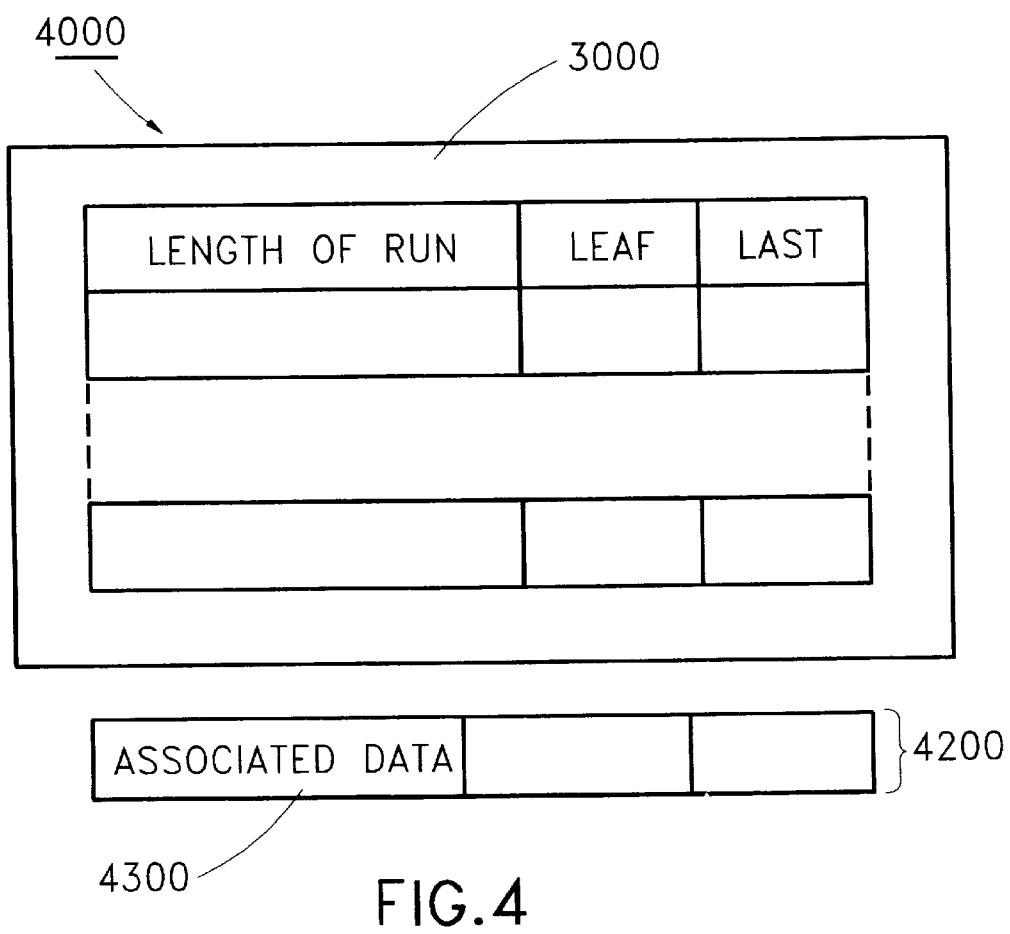
FIG. 4 is a block diagram of the data structure representing a set of points in n-dimensional space, where each point of the set is associated with a node of a rooted tree.
Figure 5:
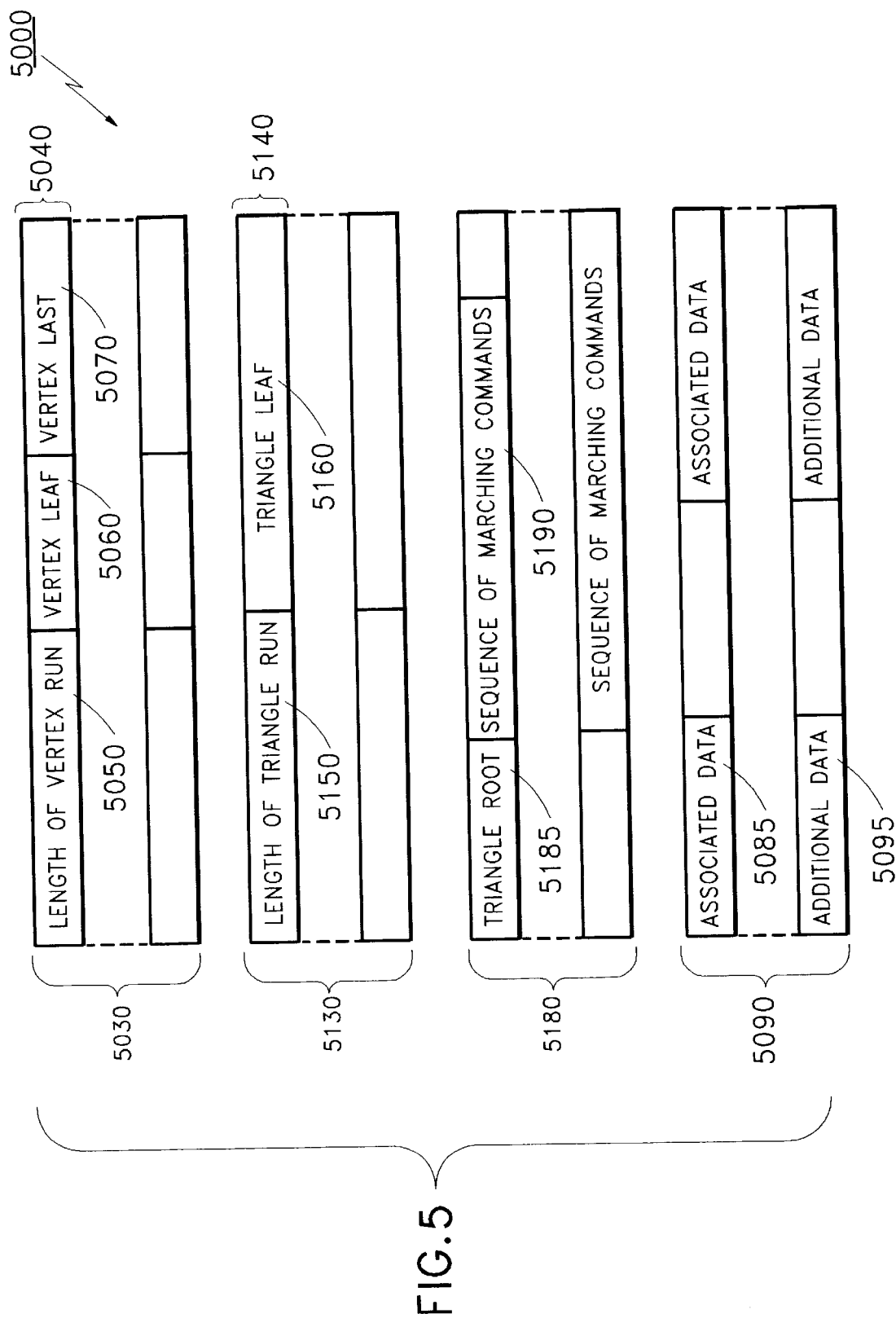
FIG. 5 is a block diagram of the data structure disclosed in this invention for representing a simple triangular mesh in n-dimensional space.

One alternative embodiment used to represent a set of points in an n dimensional space (a subset of the triangular mesh, i.e. its vertices) uses information described in data structures shown in FIGS. 3 and 4. In this embodiment that deals with a set of points in space, the points are connected by edges and these points and edges can be represented by a tree. Each node of the tree is associated with one of the points. By traversing the tree in a proper order, the points can be place in space in their original location. FIG. 3 contains data that defines the tree and FIG. 4 contains data that defines where the points are in space in relation to one another. The process shown in FIG. 15 operates on these data structures to recreate the points in space from the tree.

FIG. 3 is a block diagram of the data structure 3000 representing a rooted tree. It is composed of a *table of runs* 3200 composed of one or more *records* 3300. Each record 3300 represents a run of the rooted tree, and is composed of a length of run field 3400, a leaf field 3500, and a last field 3600. The length of run field 3400 is the number of edges connecting the first and last nodes of the run. The leaf field 3500 indicates if the last node of the run is a leaf node. There may be several runs beginning from a common first node. The "last" field 3600 indicates if the run is the last run of the set of runs starting at the common first node. The order of the records in the table is determined by the order of traversal of the rooted tree defined by the root node and the orderings assigned to the runs within each one of the sets of common first node runs. The order is defined by the compression process described below.

FIG. 4 is a block diagram of the data structure 4000 representing a set of points in n-dimensional space, where each point of the set is associated with a node of a rooted tree. The data structure 4000 is composed of the data structure 3000 representing the rooted tree, and of one additional data record 4200 having one or more associated data fields 4300, each associated data field has information about the position of one of the points.

Within the rooted tree there is a unique path from each of the nodes to the root node determined by the parent-child relationships. The unique path from each of the nodes to the root node is composed of the node and zero or more ancestor nodes of the node, with each pair of consecutive nodes connected by an edge. Because proximity of nodes in the rooted tree often implies geometric proximity of the corresponding points in n-dimensional space, in a preferred embodiment this invention also uses the positions of the points associated with one or more ancestor nodes of each node in the rooted tree to predict a predicted position of each of the points. Then a corrective term is used (encoded) that indicates the difference between the predicted position and an actual position of the point. In one preferred embodiment, the associated data field 4300 is the corrective term.

Figure 1A:
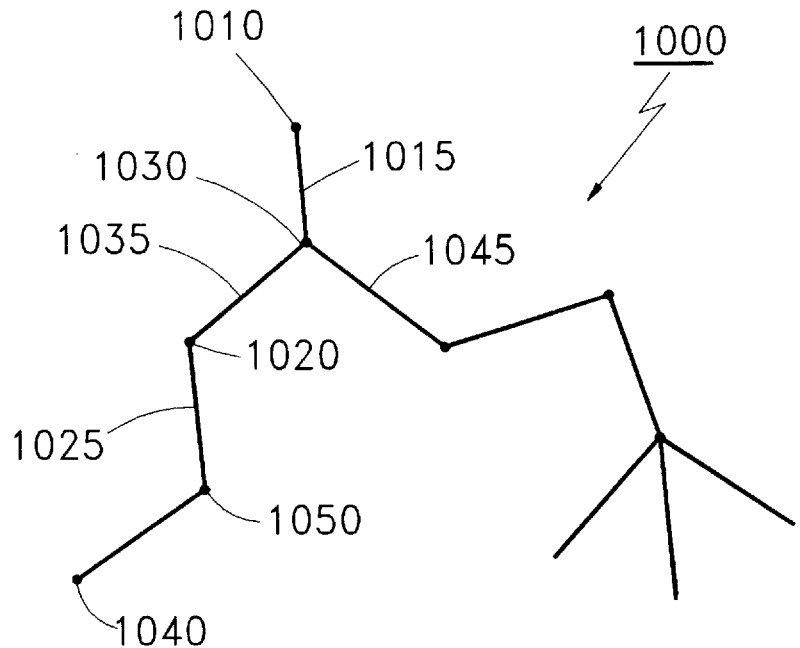
FIG. 1A and FIG. 1B, is a prior art example of trees.
Figure 1B:
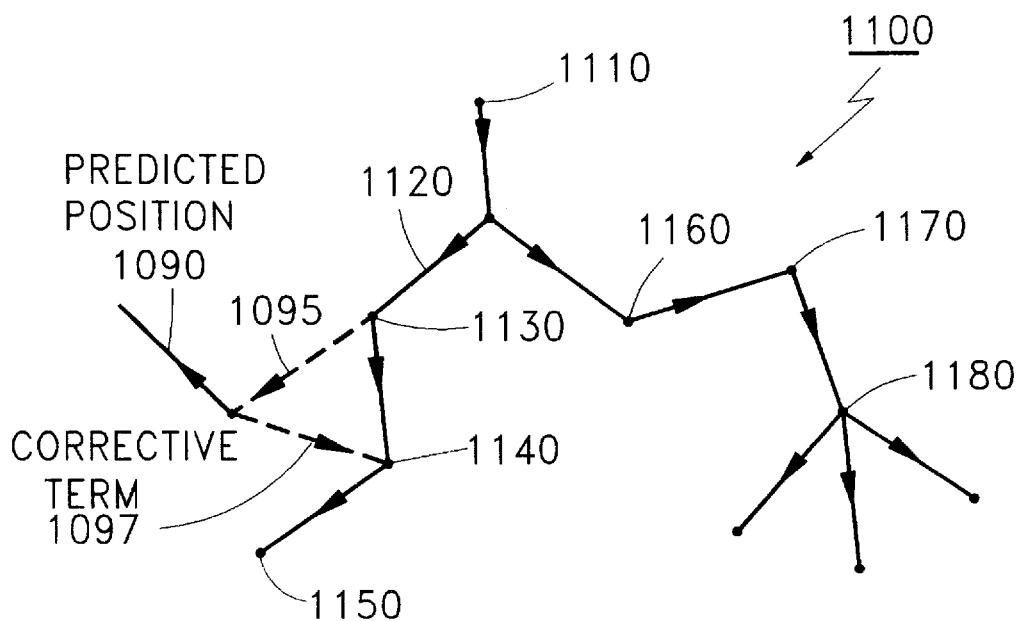
Figure 2A:
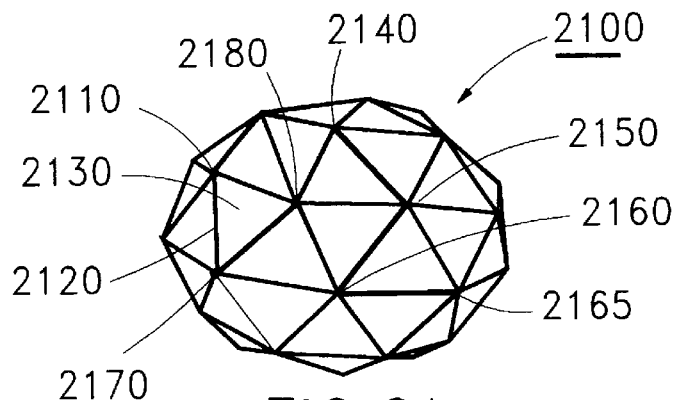
FIG. 2A, FIG. 2B, FIG. 2C, FIG. 2D, and FIG. 2E, is prior art example of triangular meshes.
Figure 2B:
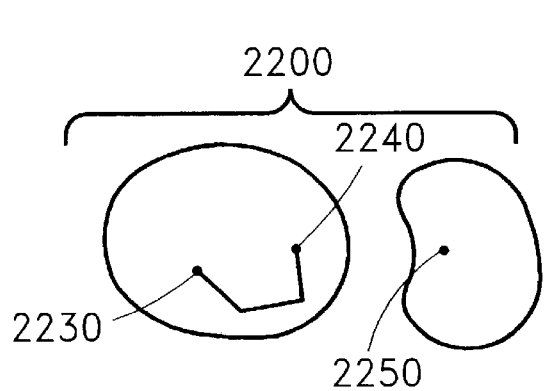
Figure 2C:
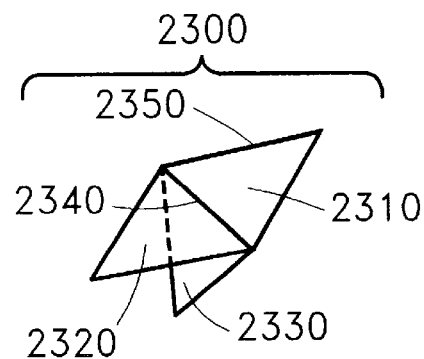
Figure 2D:
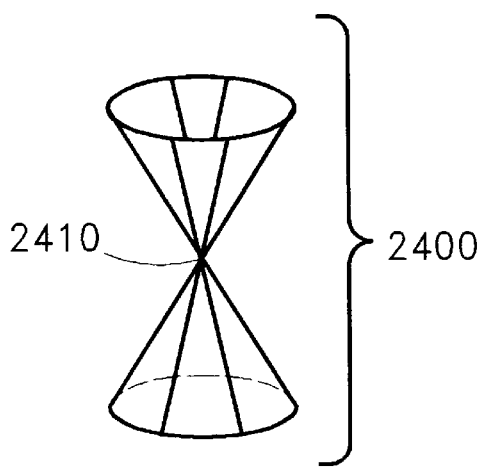
Figure 2E:
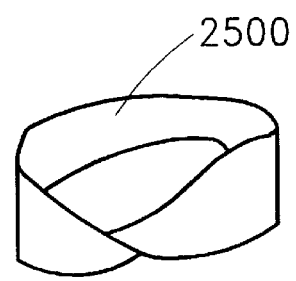

For example, in FIG. 1B, if the nodes of the rooted tree 1100 are associated with points in n-dimensional space, the path from node 1130 to the root node 1110 is composed of two ancestor nodes 1120 and 1110. The position of point 1130 is obtained by adding the corrective term 1097 to the predicted position 1090.

The *depth* of each of the nodes is the number of edges connecting nodes of the unique path from the node to the root, with the depth of the root node being equal to zero. If $\rho_n$ denotes the position of a point associated with a node of depth n, then $\rho_n$ can be decomposed as a sum $$\rho_n = \epsilon_n + P(\lambda, \rho_{n-1}, \ldots, \rho_{n-K}),$$

where $\epsilon_n$ is the corrective term associated with the point, P is a predictor function, $\lambda = (\lambda_1, \ldots, \lambda_K)$ and K is a parameter that is equal to the number of ancestors, and $\rho_{n-1}, \ldots, \rho_{n-K}$ are the positions of points associated with the K ancestors of the node along the unique path from the node to the root node. Note that since the top nodes of the rooted tree may not have K ancestors, the root node is used in place of each ancestors of negative depth. In a preferred embodiment the predictor function is a linear predictor defined by the equation $$P(\lambda, \rho_{n-1}, \ldots, \rho_{n-K}) = \lambda_1 \rho_{n-1} + \ldots + \lambda_K \rho_{n-K},$$

where $\lambda = (\lambda_1, \ldots, \lambda_K)$ and K are parameters of the predictor. Note that by choosing K=1 and $\lambda_1$=1, the deltas used by Deering are covered as a particular case. In a more preferred embodiment the parameters $\lambda_1, \ldots, \lambda_K$ are chosen by minimizing the sum of the squares of the corrective terms $$\Sigma \|\epsilon_n\|^2 = \Sigma \|P(\lambda, \rho_{n-1}, \ldots, \rho_{n-K})\|^2,$$

corresponding to all the vertices of the triangular mesh. Therefore, 4300 is the corrective term, $\epsilon_n$ that is used to move the node from its predicted position to its actual position.

In a preferred implementation the positions of the points are quantized, i.e., truncated to the nearest number in a fixed point representation scheme. In a more preferred implementation, each associated data field 4300 is a corrective term, $\epsilon_n$. In another more preferred implementation, the associated data records are compressed. In a still more preferred implementation, the associated data records are compressed by entropy encoding (described by "C. W. Brown and B. J. Shepherd" in *Graphics File Formats*, Prentice Hall, 1995; which is here incorporated by reference in its entirety).

FIG. 5 is a block diagram of the data structure 5000 disclosed in this invention for representing a simple triangular mesh in n-dimensional space. The data structure is composed of:

1) a vertex spanning tree described by a table of vertex runs 5030, the table of vertex runs having one or more vertex run records 5040, each vertex run record having a length of vertex run field 5050, a vertex leaf field 5060, and a vertex last field 5070.

2) a triangle spanning tree described by a table of triangle runs 5130, the table of triangle runs having one or more triangle run records 5140, each triangle run record having a length of triangle run field 5150 and a triangle leaf field 5160.

3) a marching record 5180 having a triangle root field 5185 and one or more sequences of marching commands 5190, the triangle root field 5185 describing how to construct the triangle associated with a triangle root node of the triangle spanning tree, and each sequence of marching commands 5190 indicating how to construct triangles from one of the triangle runs by advancing to a next vertex along either: A. a left run boundary or B. a right run boundary of the triangle run.

4) an (optional) associated data records 5080 having one or more associated data fields 5085, each associated data field with information about the position of one vertex of the simple triangular mesh.

5) one or more (optional) additional data records 5090, each additional data record 5090 having one or more additional data fields 5095, each additional data field with information about one color, normal or texture coordinates vector of the simple triangular mesh.

FIG. 6, comprising FIG. 6A, FIG. 6B, FIG. 6C, FIG. 6D, FIG. 6E, and FIG. 6F, illustrates the relation between elements of the triangular mesh and components of the data structure 5000.

Figure 6C:
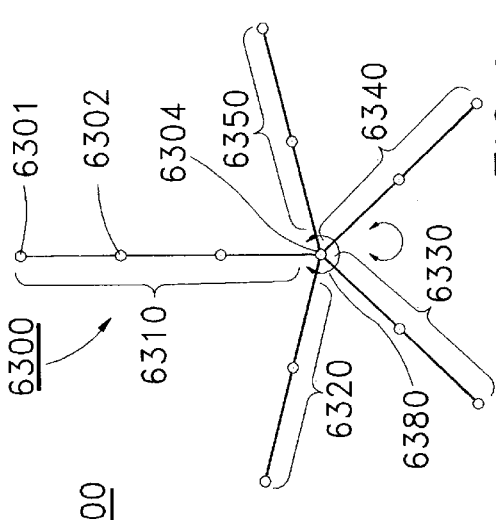
FIG. 6A, FIG. 6B, FIG. 6C, FIG. 6D, FIG. 6E, and FIG. 6F, illustrates the relation between elements of the triangular mesh and components of the data structure in FIG. 5.
Figure 6D:
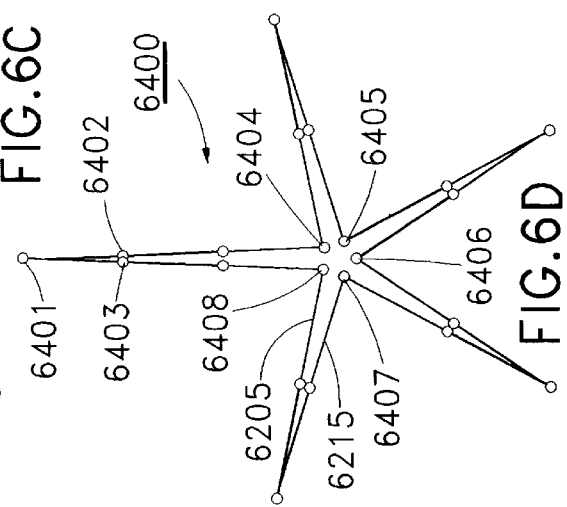
Figure 6B:
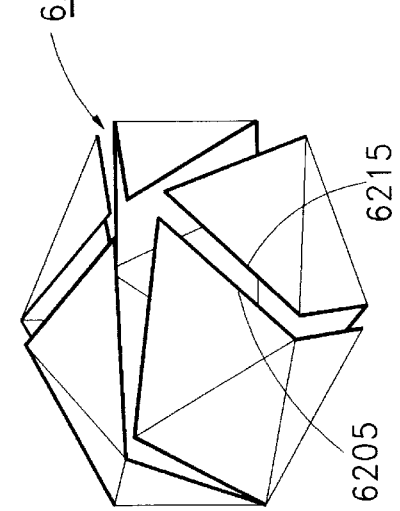
Figure 6F:
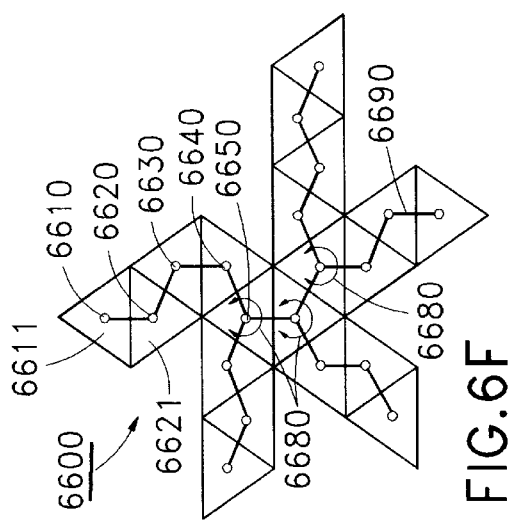
Figure 6A:
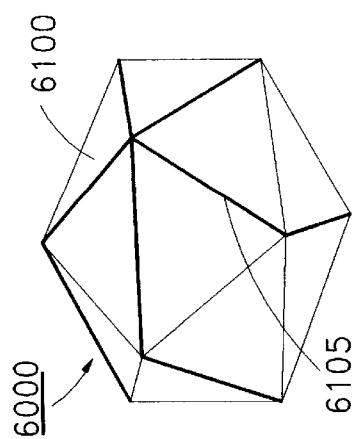
Figure 6E:
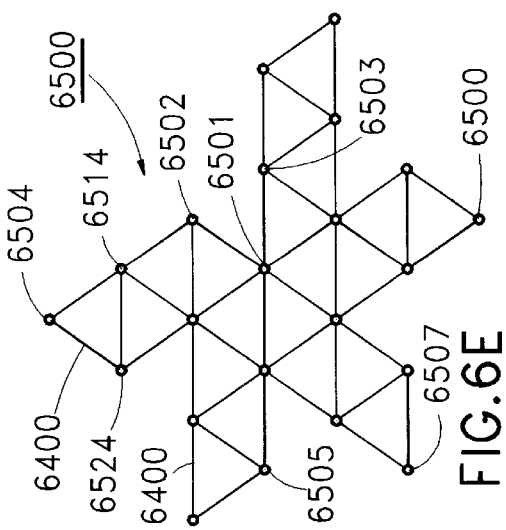

FIG. 6A is a simple triangular mesh 6000 (geometric model) with one or more edges 6105 chosen to create the vertex spanning tree 6100, also shown schematically in FIG. 6C. The simple triangular mesh is cut along the edges of the vertex spanning tree 6100 in FIG. 6B and the boundaries created by this cutting are shown in FIG. 6D. FIG. 6E shows the triangulated polygon 6500 created by "flattening" the triangular mesh, i.e. laying all the vertices and cut edges of the triangular mesh in one plane. (One can see this by visualizing cutting an orange peal, removing the peal from the orange, and laying the peal flat on a table.) FIG. 6F shows the triangle spanning tree 6690 superimposed 6600 on the triangulated polygon 6500. Using FIG. 8, the compression process 8000, the data structure 5000 is populated to represent the triangular mesh 6000 in a more compressed form.

The decompression process described in FIG. 15, traverses the triangle spanning tree 6690 described by the table of triangle runs 5130 and using information in the marching record 5180, the triangulated polygon 6500 is uniquely and completely defined. By traversing the vertex spanning tree (6300, FIG. 6C) described by the table of vertex runs 5030, the triangulated polygon 6500 is "stitched together" to recreate the triangular mesh 6000 in FIG. 6A.

In the present invention the simple triangular mesh 6000 is represented in compressed form by a *vertex spanning tree* 6100, a rooted tree, on the graph defined by the vertices and edges of the simple triangular mesh. The vertex spanning tree and the set of vertices of the mesh, considered as a set of points in n-dimensional space, is represented in the data structure 5000 by the table of vertex runs 5030, and the associated data record 5080, similarly to how a set of n-dimensional points is represented in the present invention by the table of runs 3200, and the associated data records 3100 in the data structure 4000 of FIG. 4. Optionally, the additional data records 5090 may contain additional information about colors, normals, and texture coordinates.

If the mesh is cut through the vertex tree edges, the vertex spanning tree 6100 becomes a *bounding loop* having two or more *bounding loop edges*. FIG. 6B illustrates the formation of the bounding loop 6200 by artificially enlarging the topological discontinuity created by cutting the mesh through the vertex tree edges. After cutting, each vertex tree edge 6105 corresponds to two bounding loop edges 6205, 6215. The correspondence between vertex tree edges 6105 and bounding loop edges (6205, 6215) is implicitly described by the vertex spanning tree (6100, 6300). This correspondence will be used in the compression and decompression processes below and because the correspondence is implicit, information about the correspondence does not need to be maintained. In the present invention the vertex tree edges are also called *cut edges* 6105.

FIG. 6D shows a schematic representation 6400 of the bounding loop 6200. The bounding loop 6200 has one or more bounding loop nodes, e.g. 6401. (Note that the bounding loop (6200, 6400) is also the boundary of the triangulated polygon 6500.) Each node of the vertex spanning tree, e.g. 6301–6304, corresponds to one or more of the bounding loop nodes. For example, each vertex leaf node 6301 of the vertex spanning tree corresponds to one bounding loop node 6401. Each vertex regular node 6302 of the vertex spanning tree corresponds to two bounding loop nodes 6402, and 6403. Each vertex branching node 6304 of the vertex spanning tree corresponds to three or more bounding loop nodes 6404, 6405, 6406, 6407, and 6408.

The compression process 8000 defines an vertex order of traversal 6380 of the vertex spanning tree 6300 while the decompression process 15000 uses the vertex order of traversal 6380 of the vertex spanning tree 6300 to "stitch together" the triangulated polygon 6500. The vertex order of traversal 6380 defines in which order the compression 8000 and decompression 15000 processes traverse the vertex runs of the vertex spanning tree 6300. For example, a vertex order of traversal 6380 would be to traverse vertex runs 6310 first, 6320 second, 6330 third, 6340 forth, and 6350 fifth. In a preferred embodiment, the vertex order of traversal 6380 is represented in the order that the vertex runs 5040 (3300) are place by the compression process 8000 in the table of vertex runs 5030 (3200).

When the triangular mesh 6000 is cut through the cut edges, the triangulated polygon 6500 (with no internal vertices) results. FIGS. 6E shows the triangulated polygon 6500 enclosed by the bounding loop 6400 artificially flattened. Bounding loop nodes 6401, 6402, 6403, 6404, 6405, 6406, 6407, and 6408, correspond to polygon vertices 6501, 6502, 6503, 6504, 6505, 6506, 6507, and 6508 of the triangulate polygon 6500. The bounding loop 6400 organizes the triangles of the triangulated polygon 6500 as a *triangle spanning tree* 6690 shown in FIG. 6F. The triangle spanning tree 6690 is the dual graph of the triangulated polygon 6500, with each node of the triangle spanning tree, called a triangle node (typically 6610, 6620, etc.), associated with one polygon triangle, e.g. 6611, 6621, respectively, of the triangulated polygon 6500.

The triangle spanning tree 6690 is represented in the data structure 5000 by the table of triangle runs 5130. The order of the triangle run records in the table of triangle runs is determined by a triangle order of traversal 6680 with respect to the triangle root node, e.g. 6610. (A triangle root node 6610 is the root node of the triangle spanning tree 6690 which is a rooted tree.) Each triangle run record 5140 represents a run of the triangle spanning tree and is composed of two fields. A length of run field 5150 and leaf field 5160. The meaning of these fields is the same as for the data structure 3000 of FIG. 3. However, because the triangle spanning tree is binary, no "last" field is needed in the triangle run record.

The structure of the triangle spanning tree 6690 described in the table of triangle runs 5130 does not uniquely specify how to triangulate the triangulated polygon 6500 by connecting the bounding loop nodes, e.g. 6401–6404, of the bounding loop 6400. There are many different triangulated polygons 6500 with the same dual graphs, i.e. the triangle spanning tree 6690. Therefore, information contained in the marching record 5180 is needed to complete the description of how the triangulated polygon 6500 is actually triangulated.

The triangle spanning tree 6690 is a rooted tree. The triangle root node 6610 is represented in the triangle root field 5185 of the marching record 5180 and the marching commands are represented in the marching record 5180.

In a preferred implementation, the triangle root node 6610 is a triangle leaf node of the triangle spanning tree 6690 which is identified by the second bounding loop node 6504 of the three consecutive bounding loop nodes (6514, 6504, and 6524) connected by the corresponding triangle 6611. By traversing the triangle spanning tree 6690 according to the triangle order of traversal 6680 as defined by the order of the records 5140 in the table of triangle runs 5130, the decompression process 15000 fills the bounding loop 6400 with polygon triangles, typically 6611, to reconstruct the triangulated polygon 6500.

Figure 7:
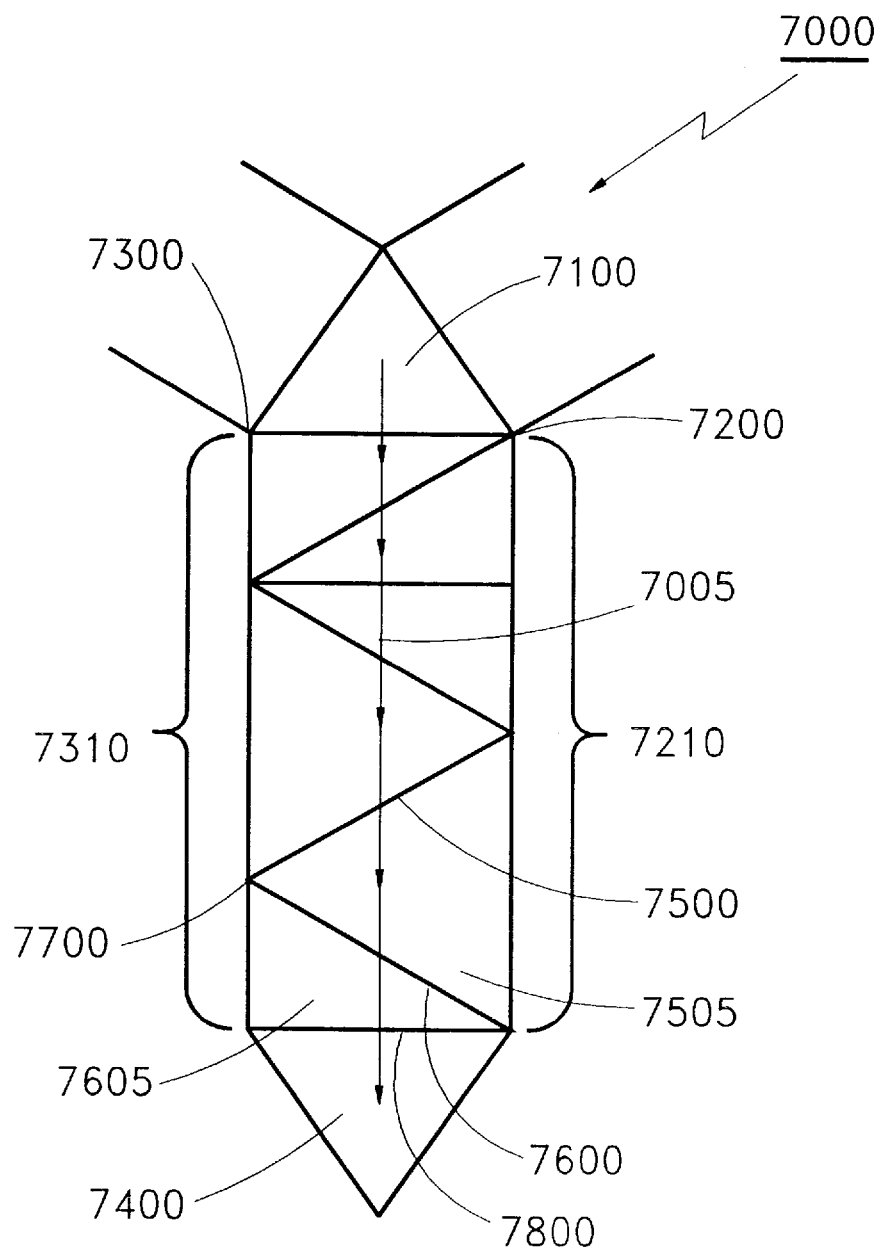
FIG. 7 illustrates the construction of a marching record which has one or more sequences of marching commands.

FIG. 7 illustrates how the compression process 8000 constructs the marching commands in each of the sequences of marching commands 5190 associated with a triangle run record 5140. An example triangle run 7000, shown in FIG. 7, illustrates how a portion of the bounding loop 6400 comprises a left run boundary 7210 and a right run boundary 7310 as determined with respect to the direction of traversal of the run 7005. As the triangle run 7000 is traversed 7005, marching edges, e.g. 7600, are crossed in an order, determined by the triangle order of traversal 6680. A marching edge is an internal edge of the triangulated polygon 6500. Each marching edge 7600 shares a vertex with the previous marching edge 7500 in the triangle run. Each shared vertex 7700 lies either on the left run boundary 7210 or on the right run boundary 7310. The compression process 8000 assigns a value in the marching record 5180 to identify whether the shared vertex 7700 lies on the left or right run boundary. As the triangle run is traversed 7005 each of the marching edges 7600 in the triangle run is identified by one of these values and the sequence of these values is the sequence of the marching commands 5190 associated with the respective triangle run 7000. For example, as the triangle run 7000 is traversed 7005, the marching edges 7500, 7600, and 7800 are crossed. Upon crossing marching edge 7500, a value of "0" is given to indicate that the triangle 7505 is constructed by advancing on the left run boundary 7210. In other words, one of the sides of triangle 7505 is on the left run boundary 7210. Upon crossing the marching edge 7600, a value of "1" is given to indicate that the triangle 7605 is constructed by advancing on the right run boundary 7310. In other words, one of the sides of triangle 7605 is on the right run boundary 7310. Note that when the last marching edge 7800 is crossed no value needs to be assigned. (See below.)

Figure 8:
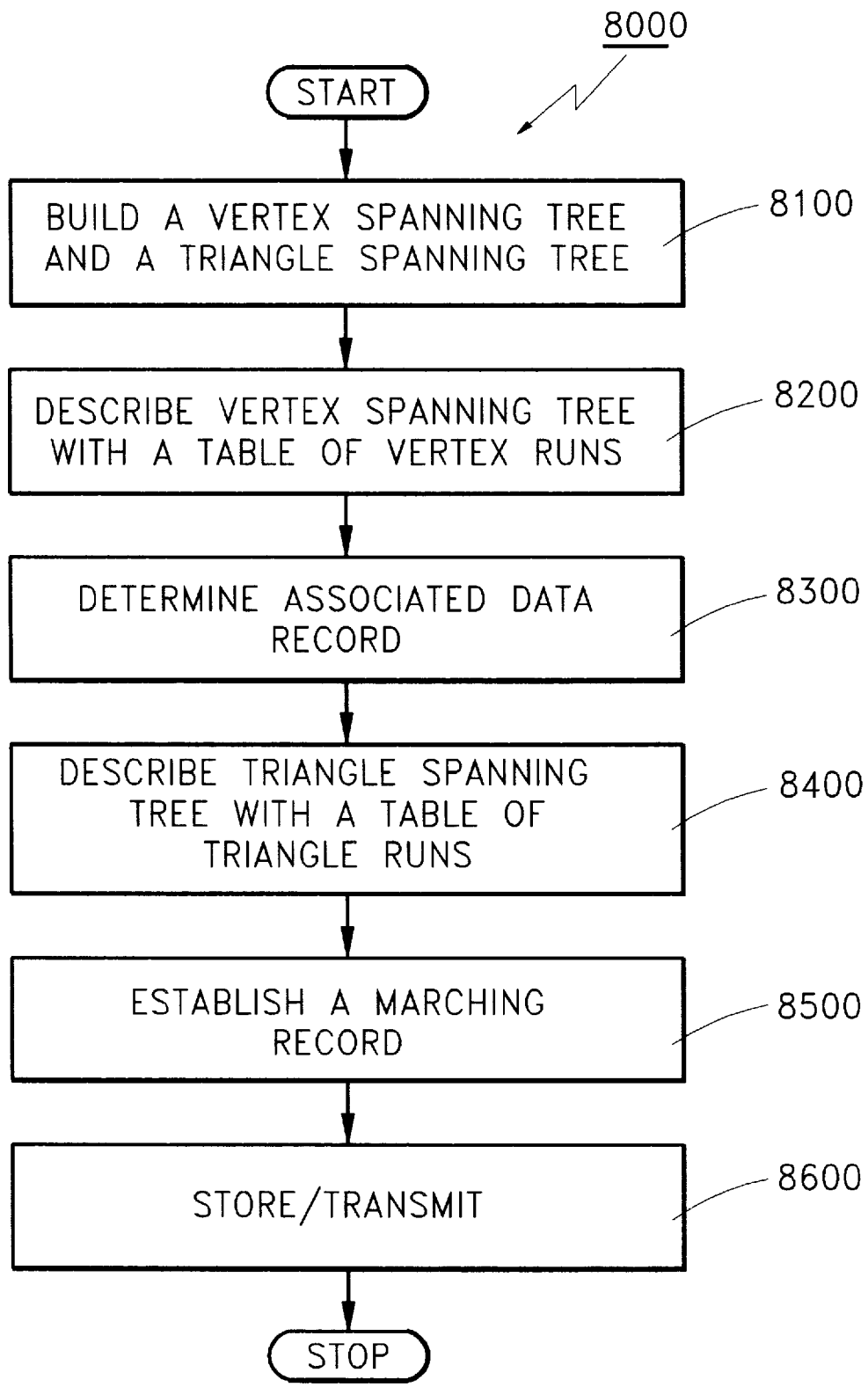
FIG. 8 is a flow chart of a method for compressing a simple triangular mesh.

FIG. 8 is a flow chart of a method 8000 for compressing a simple triangular mesh. As described above, compressing a simple triangular mesh comprises the following steps: building the vertex spanning tree and the triangle spanning tree 8100 in the graph of vertices and edges of the simple triangular mesh; describing the vertex spanning tree with a table of vertex runs 8200; describing the positions of the vertices of the simple triangular mesh with an associated data record 8300; describing the triangle spanning tree with a table of triangle runs 8400; and establishing the marching record 8500. Once these data structures are defined by the compression process 8000, the data structures can be stored 8600 in a memory and/or transmitted 8600 over a communication link, e.g. a network (internet).

In step 8100, a vertex spanning tree and a triangle spanning tree are created. This is done by determining which edges 2120 of the simple triangular mesh 6000 are cut edges 6105 (i.e., that belong to the vertex spanning tree 6100) and which edges 2120 of the simple triangular mesh 6000 are marching edges 7600 (i.e., that belong to the triangle spanning tree.) This step can be performed in several ways. See FIGS. 10–11 below.

Steps 8200, 8300, 8400, and 8500, populate the data structure 5000 in order to represent the simple triangular mesh in compressed form.

Figure 12:
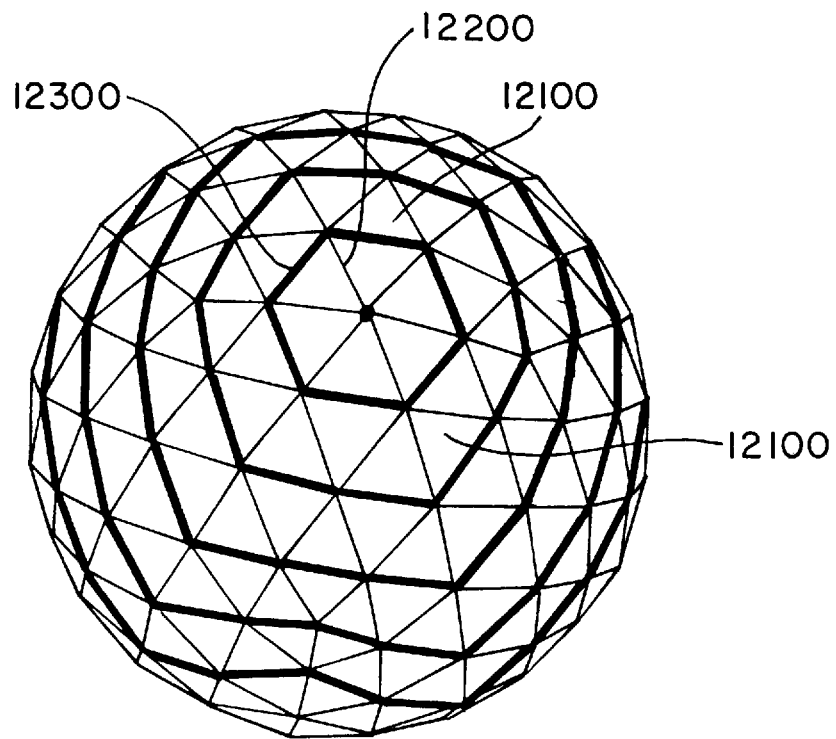
FIG. 12 is a diagram showing layering of triangles.

Step 8200 defines the vertex spanning tree 6100 in the data structure 5000 by creating records 5040 in the table of vertex runs 5030. This is further described in FIG. 12 below.

Step 8300 determines the corrective terms corresponding to all the vertices of the simple triangular mesh. This step is optionally performed. Step 8300 uses the order of traversal that is determined in step 8200 to identify the ancestors of each given vertex. The corrective terms are then determined for each given vertex as described above and placed in records 5080 of the data structure 5000. Note that in this step 8300, data representing colors, normals, texture coordinates, and other information is placed in the additional data records 5090.

Step 8400 defines the triangle spanning tree 6690 in the data structure 5000 by creating records 5140 in the table of triangle runs 5130. This is further described in FIG. 13 below.

Step 8500 establishes the marching record 5180 in the data structure 5000. This is described in FIG. 7 above.

Step 8600 stores the data structure 5000 in a memory and/or transmits the information in the data structure 5000 over a communication link. This information can be further compressed and/or encrypted by known techniques.

Figure 9A:
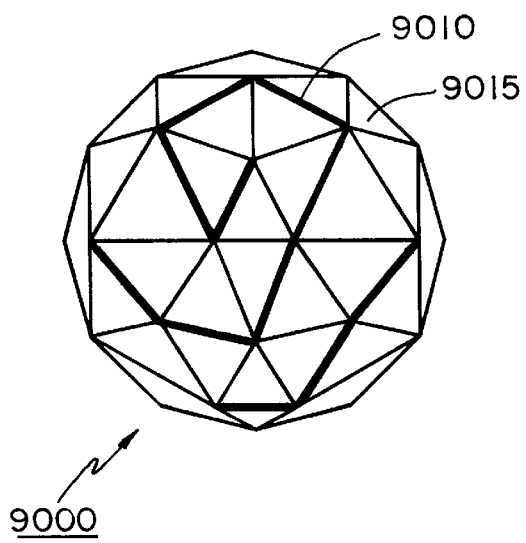
FIGS. 9A, 9B, 9C, and 9D, shows that different cutting strategies produce vertex spanning trees and triangle spanning trees with different numbers of runs.
Figure 9B:
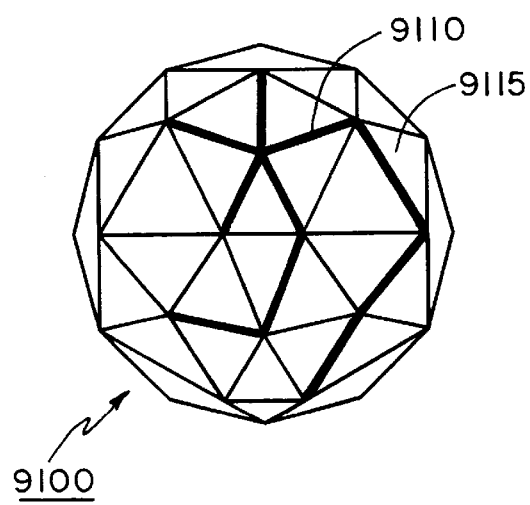
Figures 9C, 9D:
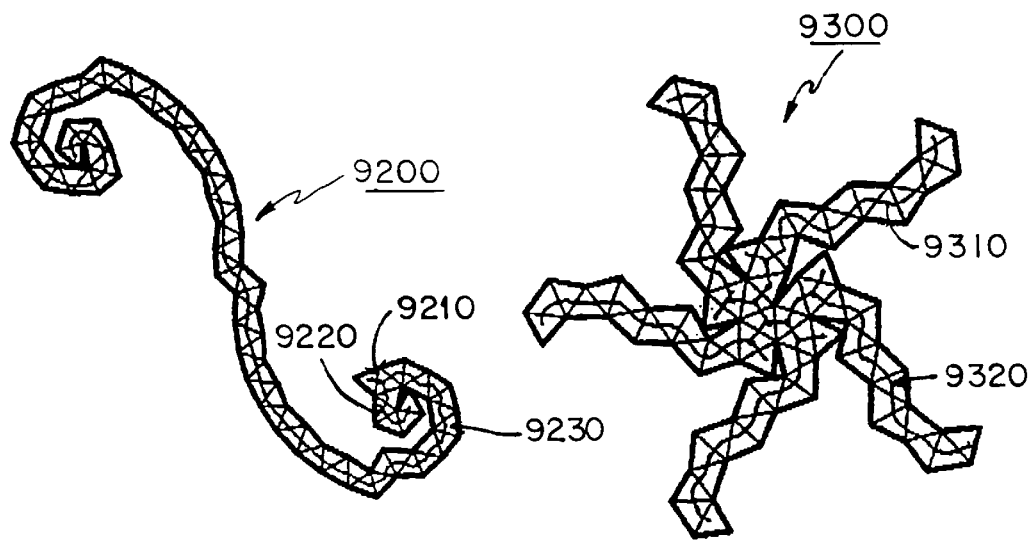

FIG. 9, comprising FIGS. 9A, 9B, 9C, and 9D, visually shows that different cutting strategies produce vertex spanning trees and triangle spanning trees with different numbers of runs. For example, when the simple triangular mesh 9000 is cut through the edges of the vertex spanning tree 9010 composed of one vertex run 9015 creating the triangle spanning tree 9200 with 3 triangle runs (9210, 9220, 9230) is obtained. However, when the same simple triangular mesh 9100 is cut through the edges of the vertex spanning tree 9110 with 5 vertex runs, typically 9115, the triangle spanning tree 9300 with 17 triangle runs, (typically 9310, 9320), is obtained instead.

Figure 10:
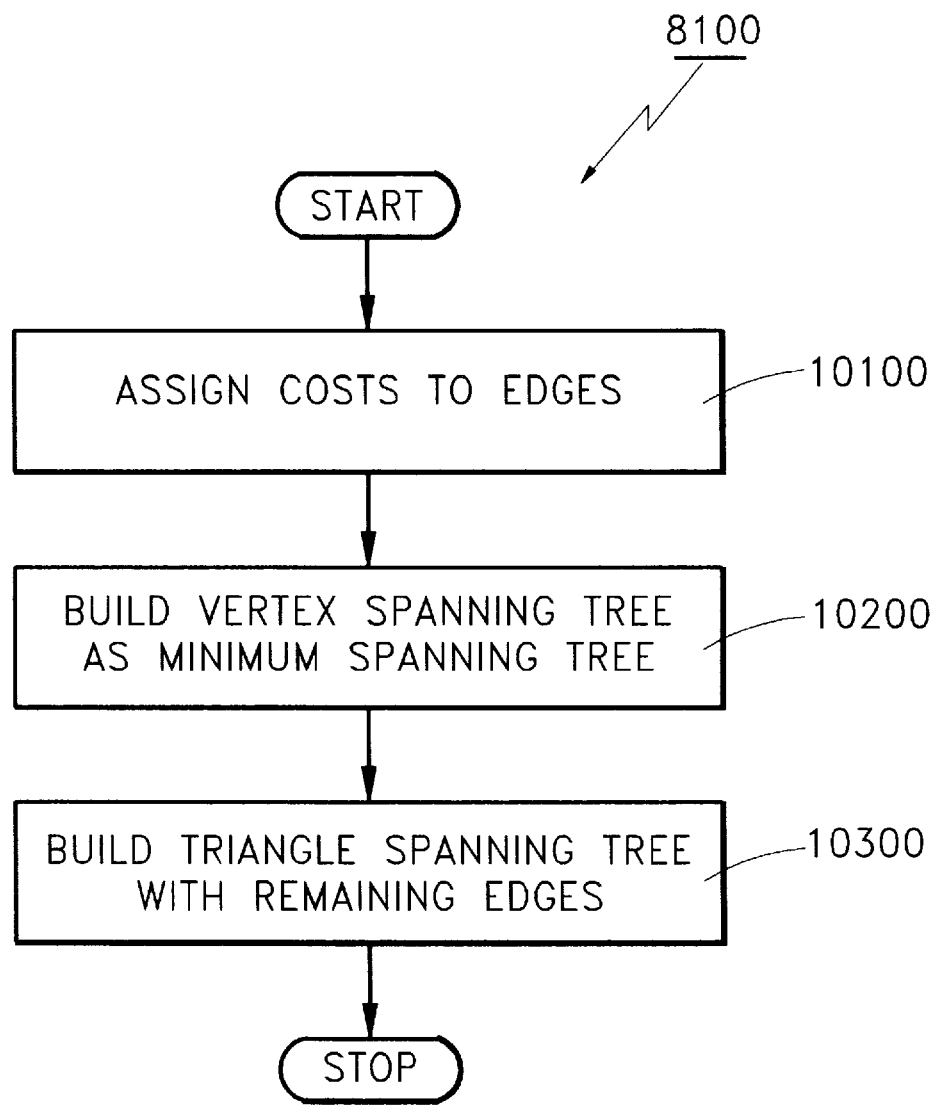
FIG. 10 is a flow chart showing the steps performed in one preferred embodiment that creates a vertex spanning tree and a triangle spanning tree.

FIG. 10 is a flow chart showing the steps performed in one preferred embodiment that creates a vertex spanning tree and a triangle spanning tree. In step 10100 a *cost* is assigned to each edge of the simple triangular mesh. In step 10200, the vertex spanning tree is constructed as the spanning tree of minimum total cost using a minimum spanning tree construction algorithm. Many such algorithms are known in the prior art. The edges are first ordered by increasing cost. In step 10300, the triangle spanning tree is constructed using all the edges not used by the vertex spanning tree.

In a more preferred embodiment in step 10100, the cost assigned to each edge of the mesh is the length of the edge. In another more preferred embodiment the cost assigned to each edge of the mesh is the Euclidean distance from the edge midpoint to the vertex associated with the vertex root node of the vertex spanning tree. In this way edges closer to the vertex spanning tree root are considered before those that are far away, and both trees grow away from the vertex spanning tree root eventually covering the whole mesh.

Figure 11:
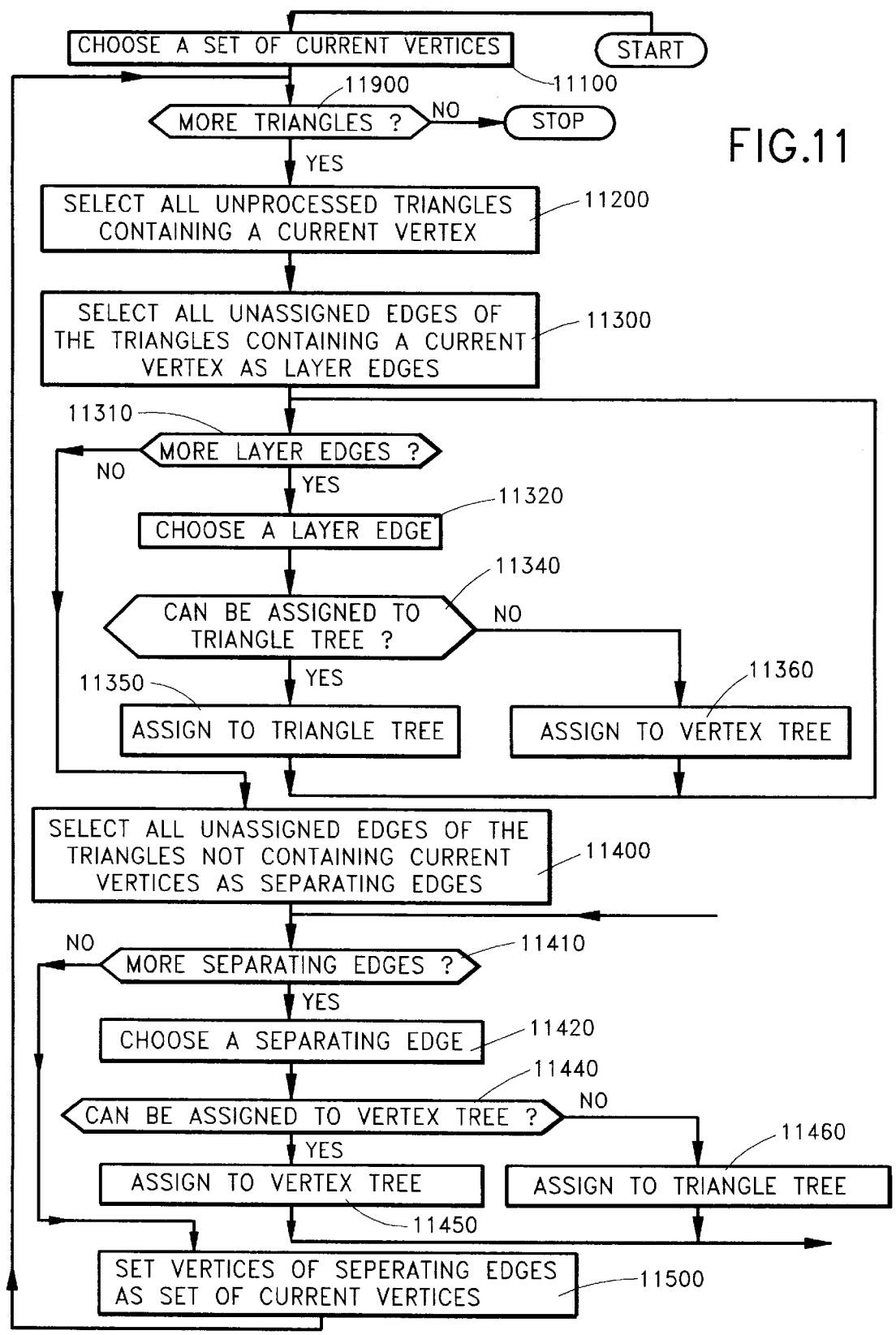
FIG. 11 is a flow chart showing the steps performed by an alternative preferred embodiment that creates a vertex spanning tree and a triangle spanning tree.

FIG. 11 is a flow chart showing the steps performed by an alternative preferred embodiment of step 8100 that creates a vertex spanning tree and a triangle spanning tree. In this embodiment of 8100, the simple triangular mesh is decomposed into a layer sequence of triangulated layers and then both the vertex spanning tree and the triangle spanning tree are incrementally constructed by visiting each of these layers in this layer sequence. Intuitively, this process mimics the act of peeling the orange by cutting concentric rings, cutting the rings open, and joining them as a spiral, illustrated in FIG. 9C.

Initially, both the vertex spanning tree 6100 and the triangle spanning tree 6690 contain no edges. In step 11100 a set of current vertices is chosen. Initially, the set of current vertices has only one vertex. Step 11150 checks to see if all of the triangles in the simple triangular mesh have been visited. If they have, the process 8100 stops. If not, step 11200 selects all unprocessed (unvisited) triangles containing one or more of the vertices in the set of current vertices chosen in step 11100. The set of selected 11200 triangles is called the current triangulated layer. An example of these current triangulated layers is shown as 12100 in FIG. 12. In step 11300, all edges that have not been assigned (see below) and that contain at least one of the vertices in the set of current vertices are selected as a set of layer edges. These layer edges 12200 are the edges that are internal to the current triangulated layer.

Steps 11310, 11320, 11340, 11350, and 11360 are the steps that assign layer edges either to the triangle spanning tree 6690 or the vertex spanning tree 6100. Step 11310 first determines if there are any remaining layer edges to be processed. If not, the process 8100 continues at step 11400. If there are remaining layer edges, a given one is chosen (step 11320) and step 11340 determines if the chosen layer edge can be assigned to the triangle spanning tree. The layer edge can be assigned to the triangle spanning tree only if it does not create a loop in the triangle spanning tree. This is determined by using well known techniques. In step 11350, the layer edge is assigned to the triangle spanning tree if it creates no loops in the triangle spanning tree. If the layer edge does create a loop in the triangle spanning tree, step 11360 assigns the layer edge to the vertex spanning tree. Note that in a simple triangular mesh, if a layer edge creates a loop in the triangle spanning tree, then it does not create a loop in the vertex spanning tree. Therefore, using this method to assign the layer edges creates no loops in either the vertex spanning tree or the triangle spanning tree.

The remaining steps of this process 8100 assign the remaining unassigned edges of the triangles in the triangulated layer. These edges are called separating edges 12300 because they separate the current triangulated layer from the next triangulated layer in the sequence of triangulated layers. Step 11400 selects these separating edges.

Steps 11410, 11420, 11440, 11450, and 11460 are the steps that assign separating edges either to the vertex spanning tree 6100 or the triangle spanning tree 6690. Step 11410 first determines if there are any remaining separating edges to be processed. If not, the process 8100 continues at step 11500. If there are remaining separating edges, a given one is chosen (step 11420) and step 11440 determines if the chosen separating edge can be assigned to the vertex spanning tree. The separating edge can be assigned to the vertex spanning tree only if it does not create a loop in the vertex spanning tree. This is determined by using well known techniques. In step 11450, the separating edge is assigned to the vertex spanning tree if it creates no loops in the vertex spanning tree. If the separating edge does create a loop in the vertex spanning tree, step 11460 assigns the layer edge to the triangle spanning tree. Note that in a simple triangular mesh, if a layer edge creates a loop in the vertex spanning tree, then it does not create a loop in the triangle spanning tree. Therefore, using this method to assign the separating edges creates no loops in either the triangle spanning tree or the vertex spanning tree.

Step 11500 sets the set of vertices contained in the separating edges as the set of current vertices and the process 8100 continues at step 11150.

Figure 13:
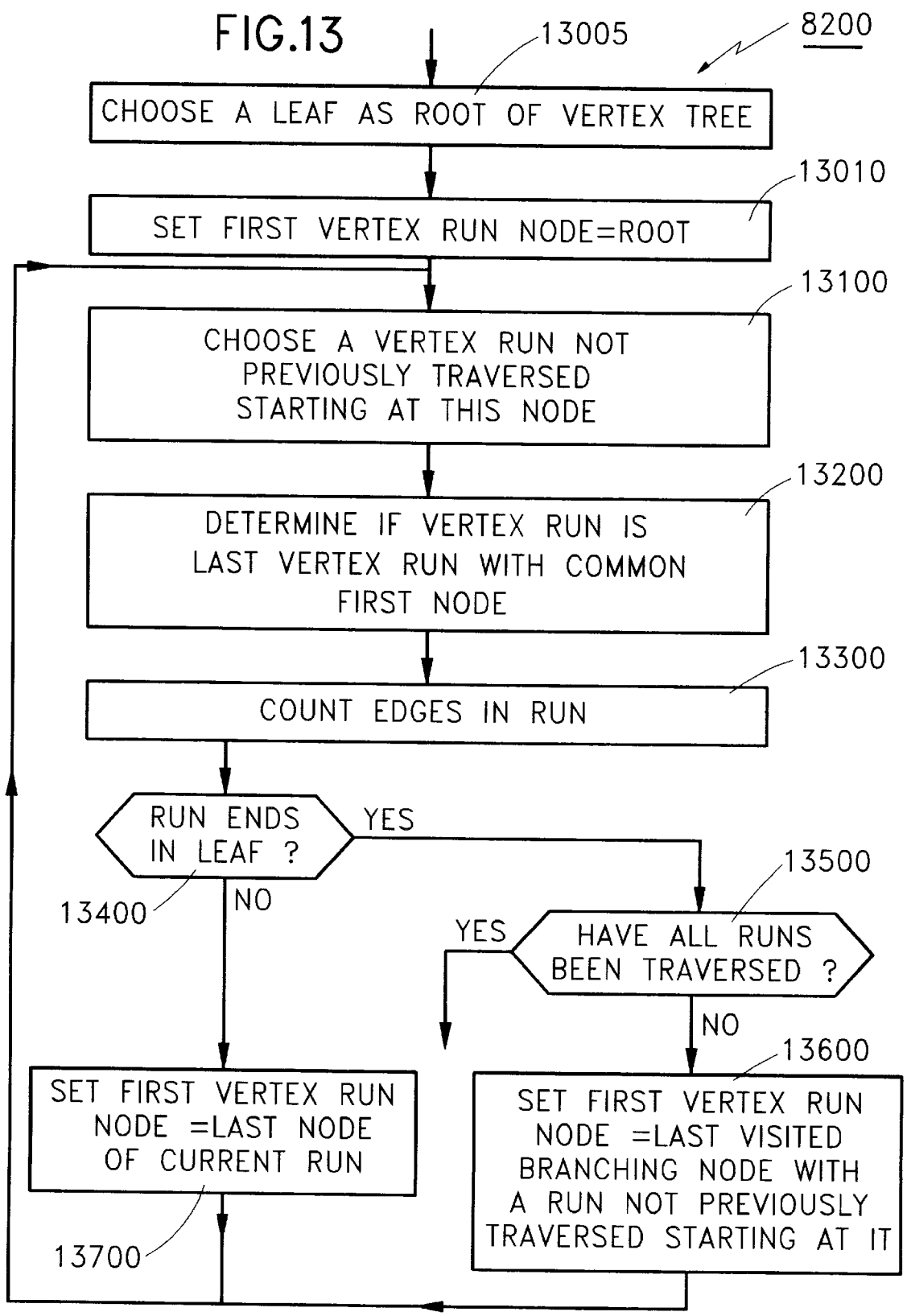
FIG. 13 is a flow chart that enters values in the table of vertex runs.

Process 8200, shown in FIG. 13, creates records 5040 in the table of vertex runs. In step 13005, the process 8200 arbitrarily chooses one of the vertex leaf nodes 6301 as a vertex root node. The chosen vertex leaf node is set 13010 to a first run node. (Note that a vertex leaf node 6301 is defined above.) This defines the first node of a vertex run.

Step 13100 chooses a run that was not previously traversed starting at the first run node. (Note that when starting at the vertex leaf node 6301, there is only one run that can be traversed). Further, the run is chosen in the vertex order of traversal 6380. The orientation of the simple triangular mesh 6000 determines a direction of rotation (clockwise or counter clockwise) around any node and, in particular, around the first run node. In one preferred embodiment, the vertex order of traversal 6380 around the first run node is determined by starting at the edge entering the first run node and taking the runs leaving the first run node in clockwise order. Alternatively, the runs can be taken in counter clockwise order. However, note that the same vertex order of traversal 6380 has to be used for every first run node in the simple triangulated mesh.

Step 13200 determines if the current run being processed is the last run to be processed of those runs that have the first run node in common. The result of this test determines the value places in "vertex last" field 5070 of the vertex run record 5040 of the table of vertex runs 5030. Step 13300 counts the edges in the run chosen in step 13100 and places this value in "length of vertex run" field 5050 of data structure 5000.

Step 13400 determines if the run ends in a leaf. The result of this test determines the value places in "vertex leaf" field 5060 of the vertex run record 5040 of the table of vertex runs 5030. If the run does not end in a leaf (i.e., it ends in a branch), the first run node is set to the last node of the current run (a branching node) and the process 8200 returns to step 13100.

If the run ends in a leaf 13400, the process 8200 determines if all the runs of the simple triangular mesh have been traversed by the process 8200, step 13500. If all the runs have been traversed, the process 8200 ends. If not, step 13600 is performed.

Step 13600 sets the first run node to the last visited branching node prior to (a parent of) the chosen leaf node that has untraversed runs and then begins the process again at step 13100. Thus, process 8200 starts at a vertex leaf node continues up the vertex spanning tree until all the runs of the vertex spanning tree have been identified and assigned with the values in the vertex run record 5040 in the data structure 5000.

Figure 14:
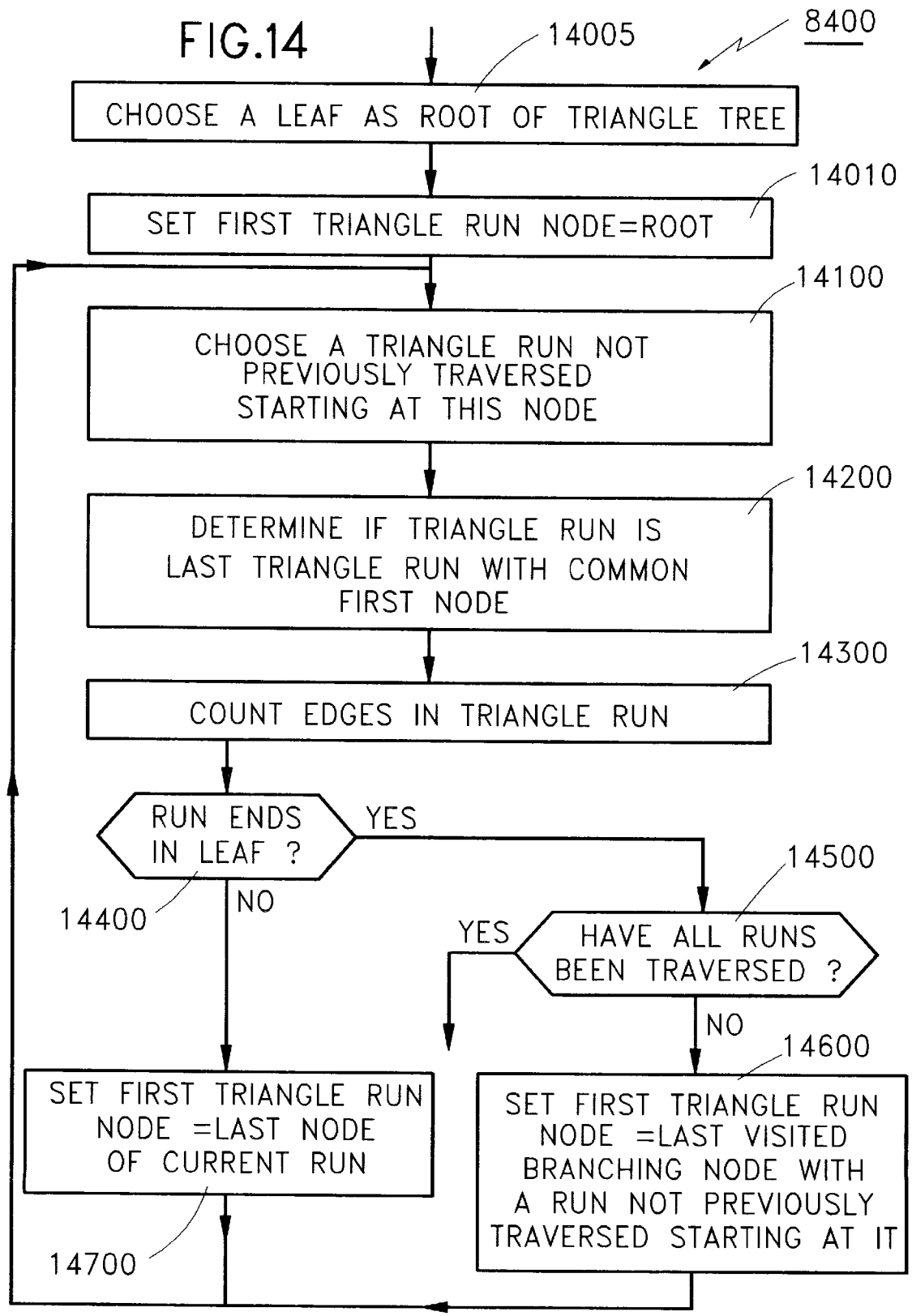
FIG. 14 is a flow chart that enters values in the table of triangle runs.

Process 8400, shown in FIG. 14, creates records 5140 in the table of triangle runs. In step 14005, the process 8400 arbitrarily chooses one of the triangle leaf nodes 6610 as a triangle root node. The chosen triangle leaf node is set 14010 to a first triangle run node. (Note that a triangle leaf node 6610 is defined above.) This defines the first node of a triangle run.

Step 14100 chooses a run that was not previously traversed starting at the first triangle run node. (Note that when starting at the triangle leaf node 6610, there is only one run that can be traversed). Further, the run is chosen in the triangle order of traversal 6680. The orientation of the simple triangular mesh 6000 determines a direction of rotation (clockwise or counter clockwise) around any node and, in particular, around the first triangle run node. In one preferred embodiment, the triangle order of traversal 6680 around the first triangle run node is determined by starting at the edge entering the first triangle run node and taking the triangle runs leaving the first triangle run node in clockwise order. Alternatively, the triangle runs can be taken in counter clockwise order. However, note that the same triangle order of traversal 6680 has to be used for every first triangle run node in the simple triangulated mesh. Further, the triangle order of traversal 6680 must be taken in the same direction as the vertex order of traversal 6380.

Step 14200 determines if the current triangle run being processed is the last triangle run to be processed of those runs that have the first triangle run node in common. Step 14300 counts the marching edges 7600 in the triangle run chosen in step 14100 and places this value in "length of triangle run" field 5150 of data structure 5000.

Step 14400 determines if the triangle run ends in a leaf. The result of this test determines the value places in "triangle leaf" field 5160 of the triangle run record 5140 of the table of triangle runs 5130. If the triangle run does not end in a leaf (i.e., it ends in a branch), the first triangle run node is set to the last triangle node of the current run (a branching node) and the process 8400 returns to step 14100.

If the run ends in a leaf 14400, the process 8400 determines if all the runs of the simple triangular mesh have been traversed by the process 8400, step 14500. If all the runs have been traversed, the process 8400 ends. If not, step 14600 is performed.

Step 14600 sets the first run node to the last visited branching node prior to (a parent of) the chosen leaf node that has untraversed runs and then begins the process again at step 14100. Thus, process 8400 starts at a triangle leaf node continues up the triangle spanning tree until all the runs of the triangle spanning tree have been identified and assigned with the values in the triangle run record 5140 in the data structure 5000.

FIG. 15 is flow chart showing the steps of a preferred decompression process 15000.

Decompressing 15000 a simple triangular mesh involves the following steps: accessing and/or receiving 15100 the data structure 5000; reconstructing 15200 the table of vertex positions; constructing 15300 a look-up table that establishes a correspondence between bounding loop nodes and vertex spanning tree nodes; computing the relative indices 15400 for Y bounding loop nodes in the order in which they will be used; and reconstructing and linking 15500 of triangle strips.

Additionally, if the compressed representation has additional data records 5090 describing colors, normals, or texture coordinates, tables of colors, normals, or texture coordinate vectors are constructed similarly to how the table of vertex positions is constructed.

In step 15100, the data structure 5000 is accessed from a memory and/or received over a communication link. The information in this data structure 5000 can be compressed further and/or encrypted as described above.

Step 15200 constructs a vertex positions array from the structure of the vertex spanning tree information contained in the table of vertex runs 5030, and the associated data record record 5080 while visiting the nodes of the vertex spanning tree according to the vertex order of traversal 6380. In a preferred embodiment, while the vertex nodes are visited during the tree traversal an array of indices to ancestors of vertices is maintained, and the positions of the vertices are computed by adding a corrective term to a predicted position of the vertex.

Step 15300 constructs a look-up table establishes a correspondence between bounding loop nodes and vertex spanning tree nodes. As an example, bounding loop node 6401 (see FIG. 6) is associated with vertex spanning tree node 6301 as bounding loop nodes 6402 and 6403 both are associated with vertex spanning tree node 6302. Therefore, while the vertex spanning tree 6300 is traversed in step 15200, the bounding loop node information for each of the vertex spanning tree nodes is determined and entered into the look-up table.

The bounding loop is constructed during the recursive traversal of the vertex spanning tree and represented by the look-up table. References to vertices encountered going down the tree are added to the table during the traversal. Except for leaf vertices, these references are also pushed onto a stack. The *last* and *leaf* fields of each vertex run which describe how the vertex runs are connected forming the vertex spanning tree are used to control the tree traversal and the stack popping.

Step 15400 computes the relative indices for Y bounding loop nodes in the order of triangle spanning tree traversal 6680. This step determines how to create a triangle at a branching node of the triangle spanning tree by finding the third vertex of the triangle on the bounding loop node. Note that the "left" and "right" vertices are already determined. See FIG. 16.

Figure 16:
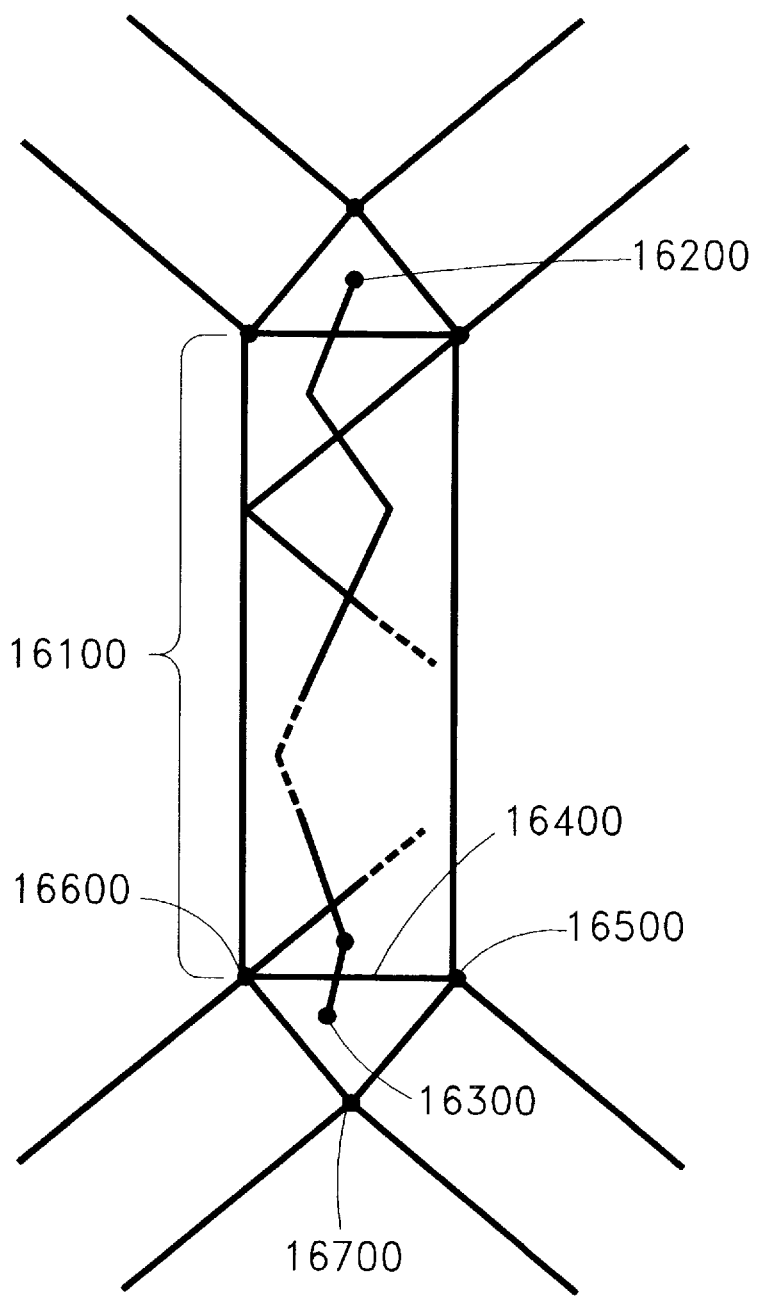
FIG. 16 is a drawing illustrating Y bounding loop nodes, i.e., how to create a triangle at a branching point in a triangle tree.

FIG. 16 illustrates the Y bounding loop nodes. A triangle run 16100 has a first node 16200 and a last node 16300. A last marching edge 16400 of the triangle run connects a last triangle associated with the last node 16300 to a previous triangle in the triangle run. The last marching edge 16400 also connects a last left bounding loop node 16500 to a last right bounding loop node 16600. The last triangle connects the last left and right bounding loop nodes to a third bounding node 16700, which we call Y bounding loop node. In order to construct the last triangle the third bounding node 16700 must be determined in a preprocessing step for every one of the last triangles, i.e., the triangles at the branching nodes. This information is implicitly contained in the table of triangle runs 5130. Therefore, before starting to construct the triangles in the triangle runs, this information about the last triangles has to be made explicit.

This is done by determining distances around the bounding loop from either the left or right direction from each branching triangle. For each branching triangle, the distance along the loop from either the left or right vertices to the Y bounding loop node, the *left branch boundary length* and *right branch boundary length*, can be computed by recursion. The length of the boundary of a branch starting with a run of length n is equal to $n+n_L+n_R-1$, where $n_L$ and $n_R$ are both equal to 1 if the runs end at a leaf triangle, and equal to the left and right branch boundary lengths of the branching triangle, if the run ends at a branching triangle.

The branch boundary lengths are computed for each branch as a preprocessing step of the decompression algorithm, and stored in a branch boundary length table. When a branching triangle is encountered during the triangle reconstruction phase, the identity of the corresponding branching vertex can be determined by adding the left branch boundary length to the loop index of the left vertex. Because of the circular nature of the bounding loop table, this addition is performed modulo the length of the bounding loop.

In step 15500, the triangles for the in the triangulated polygon are constructed as groups of three bounding loop nodes. To do this, the table of triangle runs 5130 and the marching record 5180 are used. The triangle root field 5185 of the marching record 5180 identify the three consecutive bounding loop nodes that constitute one of the triangles associated with triangle root node 6610 of the triangle spanning tree 6690. As explained in FIG. 7, the rest of the triangles in each triangle run are reconstructed by advancing on a left or a right side of the run according to the marching commands.

In one preferred embodiment, this is done by recursion with the help of two stacks, the left vertex stack, and the right vertex stack, both initially empty. With the current left and right vertices at the beginning of a triangle run of n triangles, described by a triangle run record of the table of triangle runs, the next n bits of the marching pattern identify how many vertices of the loop are traversed on each side of the strip.

If the triangle last node of the triangle run is a triangle branching node, the bounding loop node associated with the corresponding Y bounding loop node is determined from the information precomputed and stored in the branch boundary length table, and the triangle determined by the current left and right vertices and the Y bounding loop node is reconstructed, the Y bounding loop node and current right vertices are pushed onto the left and right vertex stacks, respectively, and the current right vertex is set equal to the Y bounding loop node. If the triangle last node of the triangle run is a triangle leaf node, the successor to the current right vertex should be equal to the predecessor to the current left vertex. In this case the leaf triangle is reconstructed and the current left and right vertices are popped off the left and right vertex stacks, if possible. If instead the stacks are empty, the reconstruction process stops because all the triangles have been reconstructed.

In a preferred embodiment, normals, colors, and texture coordinates are quantized, and predictor errors are entropy encoded as in the case of the vertex positions. In another preferred embodiment, normals are quantized using Deering's non-rectilinear method.

Figure 17:
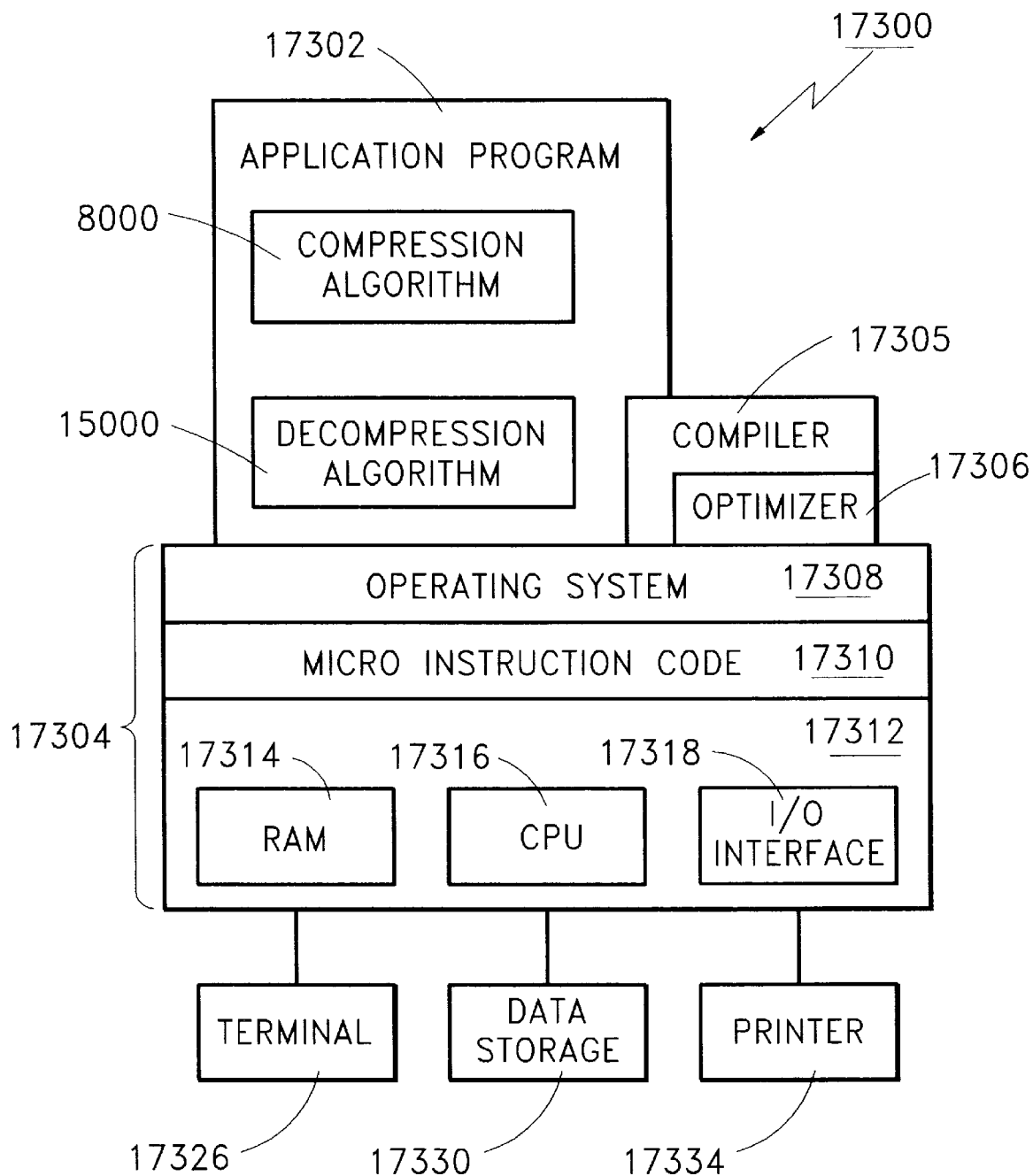
FIG. 17 is a block diagram showing a computer system on which a preferred embodiment of the present invention operates.

FIG. 17 is a block diagram showing an example computer system 17300 on which a preferred embodiment of the present invention operates. The preferred embodiment includes one or more application programs 17302. One type of application program 17302 is a compiler 17305 which includes an optimizer 17306. The compiler 17305 and optimizer 17306 are configured to transform a source (like other application programs 17302) program into optimized executable code. More generally, the source program is transformed to an optimized form and then into executable code. The compiler 17305 and optimizer 17306 operate on a computer platform 17304 that includes a hardware unit 17312. Some application programs 17302 that run on the system 17300 include the compression 8000 and decompression 15000 processes describe above.

The hardware unit 17312 includes one or more central processing units (CPU) 17316, a random access memory (RAM) 17314, and an input/output interface 17318. Microinstruction code 17310, for instance a reduced instruction set, may also be included on the platform 17304. Various peripheral components may be connected to the computer platform 10304 including a graphical interface or terminal 17326, a data storage device 17330, and a printing device 17334. An operating system 17308 coordinates the operation of the various components of the computer system 17300. An example of computer system 10300 like this is the IBM RISC System/6000 (RISC System/6000 is a trademark of the IBM Corporation.) It is readily understood that those skilled in the computer arts will be familiar with many equivalent computer systems 17300.

Figure 18:
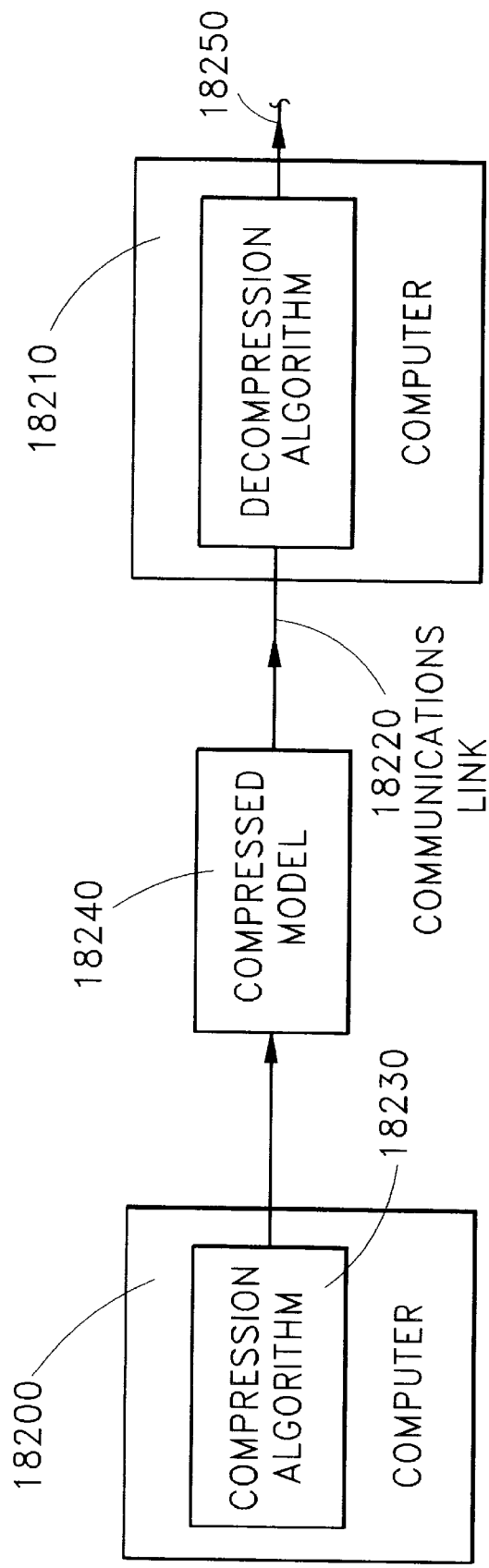
FIG. 18 is a block diagram showing a first computer connected to a second computer through a communications link.

FIG. 18 is a diagram that shows a first computer 18200 connected to a second computer 18210 through a communications link 18220. Examples of communications links are serial links (RS-232), parallel links, radio frequency links, and infra red links. Networks (LAN, WAN) are also prior art examples of communication links. Networks are commonly known. One example of network is the Internet. See U.S. Pat. No. 5,371,852 to Attanasio et. al. filed on Oct. 14, 1992, which is herein incorporated by reference in its entirety. Computer 18200 compresses a triangular mesh by running a geometric compression process 8000 and sends the resulting data structure 5000 trough the communication link 18220. Computer 18210 receives the data structure 5000 and decompresses the triangular mesh by running a geometric decompression process 15000.

A general method of compressing/decompressing geometric models is given in U.S. Patent application Ser. No. xxxx, entitled "Compression of Geometric Models Using Spanning Trees" with the same inventors and filing date as this application that is herein incorporated by reference in its entirety.

Given this disclosure alternative equivalent embodiments will become apparent to those skilled in the art. These embodiments are also within the contemplation of the inventors.

We claim:

1. A data structure in a computer memory representing a set of points of a n-dimensional space, the data structure comprising:

a table of runs describing a rooted tree, the rooted tree having one or more nodes, each node being a regular node, a branching node, or a leaf node, each node of the rooted tree represents a point of the n-dimensional space, the table of runs having one or more records, each record representing a run of the rooted tree, a run having a first node that is a leaf or branching node and a last node that is a leaf or branching node and the run connecting one or more regular nodes between the first node and the last node where the connection between every pair of consecutive nodes in the run is an edge, each record having a length of run field in terms of the number of edges in the run, a leaf field indicating if the run ends at a leaf node, and a last run field indicating if the run represented by the record is the last one with the same first node in the rooted tree, the records given by an order of tree traversal with respect to the root node.

2. A data structure, as in claim 1, further comprising an associated data field, where each associated data field is a corrective term, each corrective term being the difference between an actual position of a current point and a predicted position of the current point, where the current point is associated with one of the nodes being called a current node.

3. A data structure, as in claim 2, where the predicted position of the current point is determined by a predictive method that uses one or more ancestor points of the current point, where the ancestor points correspond to nodes that lie on a unique path from the current node to the root node.

4. A data structure, as in claim 1, where the associated data fields are in fixed point format.

5. A data structure, as in claim 1, where the associated data records are compressed.

6. A data structure, as in claim 5, where the associated data records are compressed by any one of the following techniques: Huffman encoding, Arithmetic coding, Shannon-Fano-Elias coding, or Lempel-Ziv coding.

7. A data structure, as in claim 1, that is used for storing point locations in a computer storage device.

8. A data structure, as in claim 1, that is sent from a computer over a communications link.

9. A data structure, as in claim 1, that is received by a computer over a communications link.

10. A data structure, as in claim 1, where the points represent vertices of an n-dimensional geometric shape, each tree edge corresponding to a respective shape edge of the geometric shape.

11. A data structure for representing a simple triangular mesh in n-dimensional space, comprising:

a table of vertex runs describing a vertex spanning tree, the vertex spanning tree having one or more vertex nodes, each vertex node being a regular vertex node, a branching vertex node, or a leaf vertex node, each vertex node of the vertex spanning tree associated with a vertex of the mesh, the table of vertex runs having one or more vertex run records, each vertex run record representing a vertex run of the vertex spanning tree, the vertex run having a first vertex node that is a leaf or branching vertex node and a last vertex node that is a leaf or branching vertex node and the vertex run connecting one or more regular vertex nodes between the first vertex node and the last vertex node where the connection between every pair of consecutive vertex nodes is a vertex tree edge, each vertex run record having a length of vertex run field given by the number of vertex tree edges in the vertex run, a vertex leaf field indicating if the last vertex node of the vertex run represented by the vertex run record is a leaf vertex node, and a vertex last run field indicating if the vertex run is the last vertex run sharing the same first vertex node, the vertex runs given by an order of traversal of the vertex spanning tree with respect to a vertex root node;

a table of triangle runs describing a triangle spanning tree, the triangle spanning tree having one or more triangle nodes, each triangle node being a regular triangle node, a branching triangle node, or a leaf triangle node, each triangle node of the triangle spanning tree associated with a triangle of the mesh, the table of triangle runs having one or more triangle run records, each triangle run record representing a triangle run of the triangle spanning tree, the triangle run having a first triangle node that is a leaf or branching triangle node and a last triangle node that is a leaf or branching triangle node and the run connecting one or more regular triangle nodes between the first triangle node and the last triangle node where the connection between every pair of consecutive triangle nodes is a triangle tree edge, each triangle run record having a length of triangle run field given by the number of triangle tree edges in the triangle run represented by the triangle run record, and a triangle leaf field indicating if the last triangle node of the triangle run represented by the triangle record is a leaf triangle node, the triangle runs given by an order of traversal of the triangle spanning tree with respect to a triangle root node;

a marching record having a triangle root field and one or more sequences of marching commands, the triangle root field describing how to construct the triangle associated with a triangle root node of the triangle spanning tree, each sequence of marching commands indicating how to construct triangles from one of the triangle runs by advancing to a next vertex along a left run boundary or a right run boundary of the triangle run, the marching commands given by the order of traversal of the triangle spanning tree with respect to the triangle root node; and an associated data record, the associated data record having one or more associated data fields, each associated data field with information about the position of one of the vertices of the simple triangular mesh, the associated data fields given by an order of traversal of the vertex spanning tree with respect to the vertex root node.

12. A data structure, as in claim 11, where the order of traversal of the vertex spanning tree includes any one of the following: depth first, breath first, preorder, and postorder.

13. A data structure, as in claim 11, where each associated data field is a corrective term, each corrective term being the difference between an actual position of a current vertex and a predicted position of the current vertex, where the current vertex is associated with one of the nodes being called a current node.

14. A data structure, as in claim 13, where the predicted position of the current vertex is determined by a predictive method that uses one or more ancestors vertices of the current vertex, where the ancestor vertices correspond to nodes that lie on a unique path from the current vertex node to the vertex root node.

15. A data structure, as in claim 11, where the associated data fields are in fixed point format.

16. A data structure, as in claim 11, where the associated data records are compressed.

17. A data structure, as in claim 16, where the associated data records are compressed by any one of the following techniques: Huffman encoding, Arithmetic coding, Shannon-Fano-Elias coding, or Lempel-Ziv coding.

18. A data structure, as in claim 11, where the order of traversal of the triangle spanning tree is determined by the order of triangle run records in the table of triangle runs.

19. A data structure, as in claim 18, where the order of traversal of the triangle spanning tree includes any one of the following: depth first, breath first, preorder, and postorder.

20. A data structure, as in claim 11, where the marching records are compressed.

21. A data structure, as in claim 11, where the marching records are compressed by any one of the following techniques: Huffman encoding, Arithmetic coding, Shannon-Fano-Elias coding, or Lempel-Ziv coding.

22. A data structure, as in claim 11, where each of the marching commands is a bit.

23. A data structure, as in claim 11, further comprising:
one or more additional data records, each additional associated data record having one or more additional data fields, each additional data field having additional information.

24. A data structure, as in claim 23, where the additional information includes one or more of the following: normals, colors, and textures coordinates.

25. A data structure, as in claim 11, that is used for storing a triangular mesh in a computer storage device.

26. A data structure, as in claim 11, that is sent from a computer over a communications link.

27. A data structure, as in claim 11, that is received by a computer over a communications link.

28. A data structure, as in claim 11, for representing a connected component of a triangular mesh in n-dimensional space having multiple connected components.

29. One or more computer systems for compressing and decompressing a geometric model, each computer system comprising:
a central processing unit for executing processes;
a memory;
a table of vertex runs residing on the memory describing a vertex spanning tree, the vertex spanning tree having one or more vertex nodes, each vertex node being a regular vertex node, a branching vertex node, or a leaf vertex node, each vertex node of the vertex spanning tree associated with a vertex of the mesh, the table of vertex runs having one or more vertex run records, each vertex run record representing a vertex run of the vertex spanning tree, the vertex run having a first vertex node that is a leaf or branching vertex node and a last vertex node that is a leaf or branching vertex node and the vertex run connecting one or more regular vertex nodes between the first vertex node and the last vertex node where the connection between every pair of consecutive vertex nodes is a vertex tree edge, each vertex run record having a length of vertex run field given by the number of vertex tree edges in the vertex run, a vertex leaf field indicating if the last vertex node of the vertex run represented by the vertex run record is a leaf vertex node, and a vertex last run field indicating if the vertex run is the last vertex run sharing the same first vertex node, the vertex runs given by an order of traversal of the vertex spanning tree with respect to a vertex root node;

a table of triangle runs residing on the memory describing a triangle spanning tree, the triangle spanning tree having one or more triangle nodes, each triangle node being a regular triangle node, a branching triangle node, or a leaf triangle node, each triangle node of the triangle spanning tree associated with a triangle of the mesh, the table of triangle runs having one or more triangle run records, each triangle run record representing a triangle run of the triangle spanning tree, the triangle run having a first triangle node that is a leaf or branching triangle node and a last triangle node that is a leaf or branching triangle node and the run connecting one or more regular triangle nodes between the first triangle node and the last triangle node where the connection between every pair of consecutive triangle nodes is a triangle tree edge, each triangle run record having a length of triangle run field given by the number of triangle tree edges in the triangle run represented by the triangle run record, and a triangle leaf field indicating if the last triangle node of the triangle run represented by the triangle record is a leaf triangle node, the triangle runs given by an order of traversal of the triangle spanning tree with respect to a triangle root node;

a marching record residing on the memory having a triangle root field and one or more sequences of marching commands, the triangle root field describing how to construct the triangle associated with a triangle root node of the triangle spanning tree, each sequence of marching commands indicating how to construct triangles from one of the triangle runs by advancing to a next vertex along a left run boundary or a right run boundary of the triangle run, the marching commands given by the order of traversal of the triangle spanning tree with respect to the triangle root node.

30. A system, as in claim 29, where two or more of the computer systems is connected by a communication link.

31. A system, as in claim 30, where the communication link includes any one of the following: an internet, a intranet, a wide area network, a local area network, a radio frequency link, an infra red link, and a serial communication link.

32. A system, as in claim 30, where the data the table of vertex runs, the table of triangle runs, and the a marching record is transmitted from one or more first computer systems to one or more second computer systems connected by the communication link.

33. A system, as in claim 29, further comprising a compression process for creating the table of vertex runs, the table of triangle runs, and the a marching record from the geometric model.

34. A system, as in claim 29, further comprising a decompression process for creating the geometric model from the table of vertex runs, the table of triangle runs, and the marching record.

35. A compression process comprising the steps of:
building a vertex spanning tree and a triangle spanning tree from a geometric model;
describing the vertex spanning tree with a table of vertex runs;
describing the triangle spanning tree with a table of triangle runs; and
establishing a marching record that defines how to construct one or more of the triangles in the triangle spanning tree while traversing the triangle spanning tree according to the table of vertex runs.

36. A method, as in claim 35, where the vertex spanning tree and the triangle spanning tree are built by the following steps:

assigning costs to one or more edges of the geometric model;

defining the vertex spanning tree as the spanning tree with a minimum total cost; and building the triangle spanning tree with the edges that are not included in the vertex spanning tree.

37. A method, as in claim 35, where the vertex spanning tree and the triangle spanning tree are built by the following steps:

a. choosing a set of one or more current vertices of the geometric model;

b. selecting all triangles that contain a current vertex and that have not been visited as a current triangulated layer;

c. select as layer edges all edges of the triangles that have not been assigned and that contain at least one of the current vertices, the unselected edges being separating edges;

d. assign each of the layer edges to the triangle spanning tree if the layer edges does not create a loop in the triangle spanning tree, otherwise assign the vertex spanning tree;

e. assign each of the separating edges to the triangle spanning tree if the layer edges does not create a loop in the triangle spanning tree, otherwise assign the vertex spanning tree;

f. select the separating edges as the set of current vertices;

g. repeat steps a through f until there are no more edges; and h. construct the vertex spanning tree and the triangle spanning tree using the respective assigned edges.

38. A decompression process comprising the steps of:

reconstructing vertex positions;

constructing a bounding loop;

determining relative indices of one or more Y-bounding loop nodes; and reconstructing and linking one or more triangle strips.

* * * * *